(12) United States Patent
Gellibolian et al.

(10) Patent No.: US 9,212,067 B2
(45) Date of Patent: Dec. 15, 2015

(54) WATER BOTTLE WITH FLOW METER

(71) Applicant: Floz, Inc., Glendale, CA (US)

(72) Inventors: Robert Gellibolian, Glendale, CA (US); John Stump, Santa Barbara, CA (US)

(73) Assignee: FLOZINC, LLC, Glendale, CA (US)

( * ) Notice: Subject to any disclaimer, the term of this patent is extended or adjusted under 35 U.S.C. 154(b) by 19 days.

(21) Appl. No.: 13/906,197

(22) Filed: May 30, 2013

(65) Prior Publication Data

US 2013/0319915 A1    Dec. 5, 2013

Related U.S. Application Data

(60) Provisional application No. 61/668,401, filed on Jul. 5, 2012, provisional application No. 61/653,338, filed on May 30, 2012.

(51) Int. Cl.
*C02F 1/00* (2006.01)
*C02F 1/32* (2006.01)
(Continued)

(52) U.S. Cl.
CPC . *C02F 1/002* (2013.01); *C02F 1/32* (2013.01); *C02F 1/44* (2013.01); *C02F 1/68* (2013.01); *C02F 2209/40* (2013.01); *C02F 2307/02* (2013.01)

(58) Field of Classification Search
CPC .............. C02F 1/32; C02F 1/68; C02F 1/685; C02F 2201/007; C02F 2201/006; C02F 2201/32; C02F 2209/005; C02F 2209/40; C02F 2305/14; C02F 2307/02; C02F 1/002; C02F 1/003; C02F 1/686; C02F 1/687; C02F 1/688; C02F 9/005; C02F 1/325; C02F 1/44; B65D 25/08; B05B 11/30; B05B 11/3001; B05B 11/3002; B05B 11/3004; B05B 11/305; B05B 11/3052
USPC ............ 212/500, 501; 210/198.1, 748.1, 143, 210/87, 97; 220/705; 215/386
See application file for complete search history.

(56) References Cited

U.S. PATENT DOCUMENTS

| | | |
|---|---|---|
| 1,190,609 A | 7/1916 | Von Recklinghausen |
| 1,898,365 A | 2/1933 | Harding |

(Continued)

FOREIGN PATENT DOCUMENTS

| | | |
|---|---|---|
| DE | 42 28 860 A1 | 3/1994 |
| DE | 199 11 443 A1 | 9/2000 |

(Continued)

*Primary Examiner* — Lucas Stelling
*Assistant Examiner* — Rohit K Dewan
(74) *Attorney, Agent, or Firm* — One3 IP Management, P.C.; Jeromye V. Sartain; Dean G. Stathakis

(57) ABSTRACT

According to the present invention, a fluid and/or aqueous additive delivery system is provided. According to the present invention, a modular fluid container is described for consumption of liquids. Fluid containers according to the present invention include any combination of four distinct modular components; (1) an end-point filter purification module for removal of impurities from water, (2) a UV purification module for emitting ultraviolet (UV) light in a germicidal spectrum for disinfection, (3) a tablet storage and dispensing module to emit ultraviolet (UV) light in a germicidal spectrum for disinfection of a volume of drink liquid held in the container, (4) a flow meter module for quantitatively monitoring hydration in real time. The user can personalize the bottle with any or all modules that are required.

20 Claims, 12 Drawing Sheets

(51) Int. Cl.
*C02F 1/44* (2006.01)
*C02F 1/68* (2006.01)

(56) References Cited

U.S. PATENT DOCUMENTS

| | | |
|---|---|---|
| 1,965,947 A | 7/1934 | Prouty |
| 2,470,806 A | 5/1949 | Del Cueto |
| 2,669,661 A | 2/1954 | Riddiford et al. |
| 3,500,041 A | 3/1970 | Kassing |
| 3,566,105 A | 2/1971 | Wiltrout et al. |
| 3,683,177 A | 8/1972 | Veloz |
| 3,843,521 A | 10/1974 | Zeff |
| 3,906,236 A | 9/1975 | Callahan |
| 3,970,856 A | 7/1976 | Mahaffey et al. |
| 4,066,551 A | 1/1978 | Stern |
| 4,101,777 A | 7/1978 | Reid |
| 4,184,076 A | 1/1980 | Kosnoff |
| 4,274,970 A | 6/1981 | Beitzel |
| 4,276,256 A | 6/1981 | Karamian |
| 4,296,328 A | 10/1981 | Regan |
| 4,390,432 A | 6/1983 | Takeguchi et al. |
| 4,416,854 A | 11/1983 | Nielsen |
| 4,559,478 A | 12/1985 | Fuller et al. |
| 4,752,401 A | 6/1988 | Bodenstein |
| 4,755,292 A | 7/1988 | Merriam |
| 4,762,613 A | 8/1988 | Snowball |
| 4,790,946 A | 12/1988 | Jansen |
| 4,849,100 A | 7/1989 | Papandea |
| 4,857,204 A | 8/1989 | Joklik |
| 4,902,411 A | 2/1990 | Lin |
| 4,912,375 A | 3/1990 | Deglon et al. |
| 4,971,687 A | 11/1990 | Anderson |
| 4,981,651 A | 1/1991 | Horng |
| 4,992,169 A | 2/1991 | Izumiya |
| 5,106,495 A | 4/1992 | Hughes |
| 5,173,269 A | 12/1992 | Mon et al. |
| 5,208,461 A | 5/1993 | Tipton |
| 5,266,215 A | 11/1993 | Engelhard |
| 5,393,419 A | 2/1995 | Tiede et al. |
| 5,484,538 A | 1/1996 | Woodward |
| 5,597,482 A | 1/1997 | Melyon |
| 5,628,895 A | 5/1997 | Zucholl |
| 5,669,221 A | 9/1997 | LeBleu et al. |
| 5,809,185 A | 9/1998 | Mitchell |
| 5,845,504 A | 12/1998 | LeBleu |
| 5,900,212 A | 5/1999 | Maiden et al. |
| 5,919,422 A | 7/1999 | Yamanaka et al. |
| 6,042,720 A | 3/2000 | Reber et al. |
| 6,110,424 A | 8/2000 | Maiden et al. |
| 6,144,175 A | 11/2000 | Parra |
| 6,212,959 B1 | 4/2001 | Perkins |
| 6,264,836 B1 | 7/2001 | Lantis |
| 6,436,299 B1 | 8/2002 | Baarman et al. |
| 6,514,405 B1 | 2/2003 | Lifschitz |
| 6,579,495 B1 | 6/2003 | Maiden |
| 6,589,490 B1 | 7/2003 | Parra |
| 6,764,888 B2 | 7/2004 | Khan et al. |
| 6,767,453 B2 | 7/2004 | Lifschitz |
| 6,861,652 B2 | 3/2005 | Wismeth |
| 6,943,377 B2 | 9/2005 | Gaska et al. |
| 7,002,161 B2 | 2/2006 | Greene |
| 7,081,225 B1 | 7/2006 | Hollander |
| 7,306,716 B2 | 12/2007 | Baarman |
| 7,390,417 B2 | 6/2008 | Kuhlmann et al. |
| 7,550,089 B2 | 6/2009 | Kuhlmann et al. |
| 7,641,790 B2 | 1/2010 | Maiden |
| 7,713,483 B2 | 5/2010 | Maiden |
| 7,741,806 B2 | 6/2010 | Kuhlmann et al. |
| 7,854,104 B2 | 12/2010 | Cronin et al. |
| 2005/0035041 A1* | 2/2005 | Nohren et al. ............ 210/266 |
| 2005/0118054 A1 | 6/2005 | Lentz et al. |
| 2005/0182356 A1* | 8/2005 | Dixon ...................... 604/77 |
| 2005/0189290 A1 | 9/2005 | Maiden |
| 2005/0205480 A1 | 9/2005 | Kuhlmann et al. |
| 2006/0011526 A1 | 1/2006 | Baarman et al. |
| 2006/0151381 A1 | 7/2006 | Wennerstrom |
| 2006/0163126 A1* | 7/2006 | Maiden ...................... 210/192 |
| 2006/0163169 A1* | 7/2006 | Eckhardt et al. ............ 210/748 |
| 2007/0165186 A1 | 7/2007 | Copner et al. |
| 2008/0237233 A1 | 10/2008 | Choi et al. |
| 2009/0205972 A1 | 8/2009 | Kuhlmann et al. |
| 2010/0044582 A1 | 2/2010 | Cooper et al. |
| 2010/0102002 A1* | 4/2010 | O'Brien et al. ............ 210/668 |
| 2010/0237033 A1* | 9/2010 | Windmiller ................ 215/2 |
| 2011/0168644 A1 | 7/2011 | Harris et al. |
| 2011/0174993 A1 | 7/2011 | Blain |

FOREIGN PATENT DOCUMENTS

| | | |
|---|---|---|
| GB | 2301272 A | 11/1996 |
| JP | 02-003892 A | 1/1990 |
| JP | 02-006892 A | 1/1990 |
| JP | 08-033887 A | 2/1996 |
| JP | 08-066678 A | 3/1996 |
| JP | 08-117742 A | 5/1996 |
| JP | 11-155932 A | 6/1999 |
| JP | 2001-347265 A | 12/2001 |
| KR | 19840000820 Y1 | 5/1984 |
| KR | 2020090011222 U | 11/2009 |
| KR | 1020110133745 A | 12/2011 |
| WO | 00/09449 A2 | 2/2000 |
| WO | 02/12127 A2 | 2/2002 |
| WO | 2004/028290 A1 | 4/2004 |
| WO | WO 2006076813 A1 * | 7/2006 ............ C01F 1/32 |
| WO | 2010/025521 A1 | 3/2010 |
| WO | WO 2010081075 A2 * | 7/2010 ............ C02F 9/00 |
| WO | WO 2011133577 A2 * | 10/2011 ............ B65D 51/28 |
| WO | 2014004559 A1 | 1/2014 |

* cited by examiner

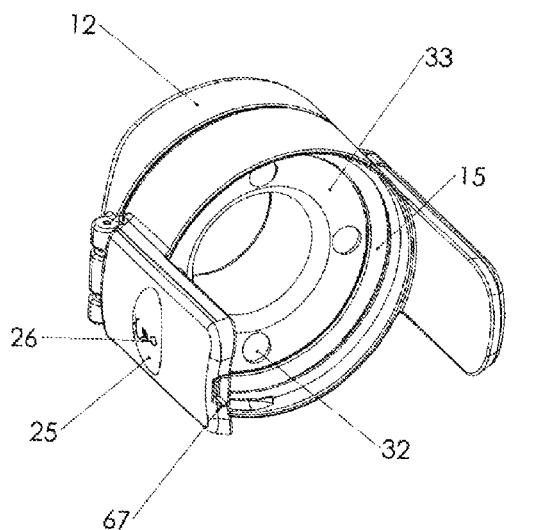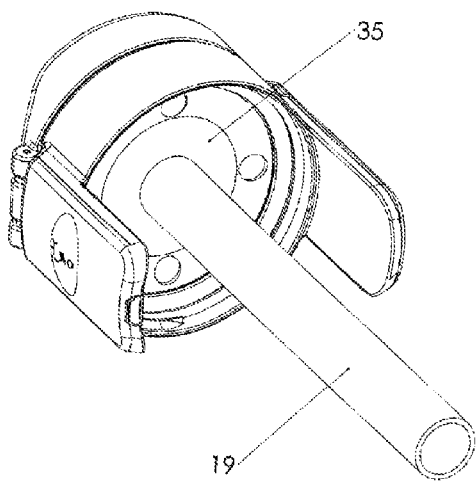
FIG. 4A　　　　　　　FIG. 4B
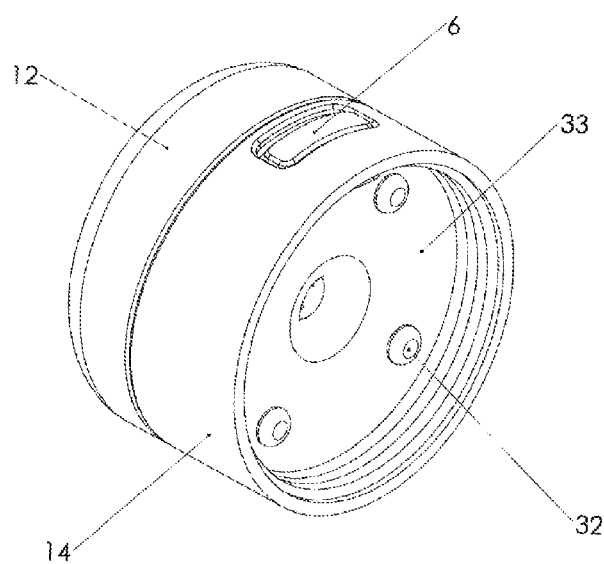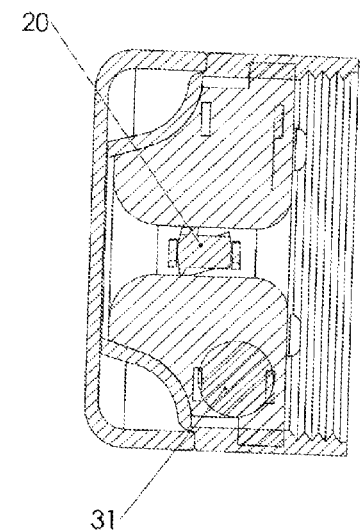
FIG. 5A　　　　　　　FIG. 5B

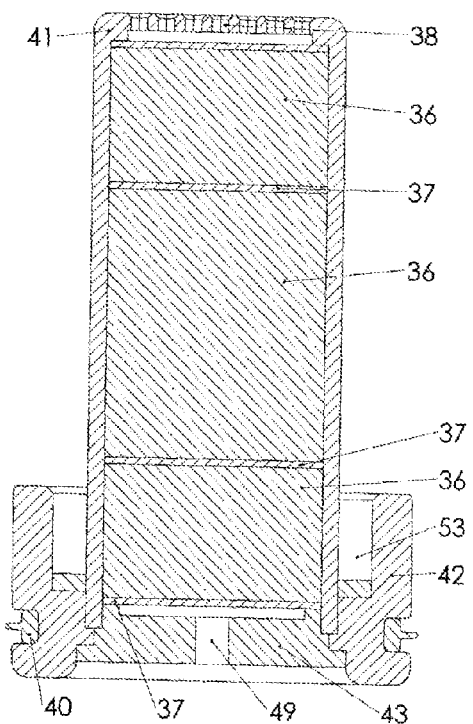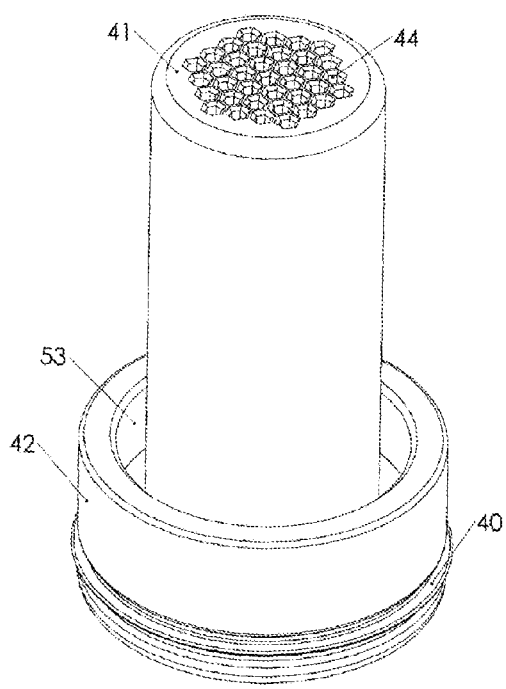
FIG. 10E
FIG. 10F

WATER BOTTLE WITH FLOW METER

This application is a U.S. Non-Provisional Patent Application and claims priority pursuant to 35 U.S.C. §119(e) to U.S. Provisional Patent Application 61/668,401, filed Jul. 5, 2012, and U.S. Provisional Patent Application 61/653,338, filed May 30, 2012, each of which is hereby incorporated by reference in its entirety.

BACKGROUND

Water is essential for daily life, especially for keeping the body hydrated and healthy. Dirty water can pose significant health risks, but municipal filtration or purification systems generally remove such contaminants before they reach the home, but people who camp or who travel abroad may benefit from a portable water filtering system to prevent sickness and gastrointestinal disorders like travelers diarrhea. Water filters help remove viruses and various protozoa that may cause illness or disease. UV sterilization units can also disinfect unsafe water. What's more, most filter-based purification systems in the market are based on "active" filtration, whereby the filters (designed in the cap) work by actively filtrating source water during consumption. This restricts the use of functional ingredients in the water as active filtration will remove or eliminate the functional components, leading to deterioration of the filter.

Conventionally, many individuals carry drink bottles or other containers that contain water or other potable beverages. However, in some situations it may be difficult for an individual to carry a large enough supply of potable water or other beverage for a specific activity, and it may be difficult for an individual to obtain potable water in certain locations. For example, backcountry enthusiasts, endurance athletes, military personnel, and others that travel in remote areas for extended periods of time and without access to clean drinking water may not be able to carry a sufficiently large supply of potable water or other beverage to maintain proper hydration. It is common for such persons to rely on water filters, which require time-consuming operation and may take up storage volume that is at a premium. It is also common for such persons to rely on water additives, such as iodine, to purify drinking water; however, such additives are often undesirable due to the taste they impart to the drinking water.

Hydration with water and electrolyte containing fluids is also important to professional and amateur athletes, as well as those with medical conditions, which require monitoring of fluid intake. Sport, travel and general merchandise stores commonly sell articles for holding water and hydrating fluids for use during a variety of activities to enable the user to keep one's body healthfully hydrated, ward off thirst and improve sports performance. These fluid carrying articles (water bottles) are used for, and during, activities from leisurely walking and everyday use to hiking and more endurance sports or activities such as running, biking, in-line skating, triathlons and adventure racing among others.

However, every person loses electrolytes at different rates from said activities. As such, each person's body requires a rate of hydration and electrolyte replacement that will largely be dictated by various factors including but not limited to; 1) the rate of fluid and electrolyte loss, which is largely dependent on an individual's biological and psychological predisposition during said activity, 2) the environmental conditions, including altitude, temperature, etc., where said activity is taking place, and 3) length and duration of said activity.

Although various hydrating fluid containers are known, they each suffer from drawbacks of one sort or another. For example, most water bottle solutions in the market are designed to adhere to the basic aesthetic and functional demands of keeping one's body hydrated. However, there are no known fluid containers that address the problem of accounting for fluid and electrolyte loss and intake by the user. In addition, few solutions exist whereby a fluid container can store and dispense a number of supplemental components such as electrolyte packages into the liquid. However, most such electrolyte delivery solutions are through disposable caps. Therefore, given that under-hydration can seriously compromise the performance of an athlete, a quantitative solution that addresses fluid and electrolyte intake/loss with a non-disposable electrolyte built-in storage and dispensing system is desirable.

SUMMARY

In an aspect of the present invention, a fluid container comprises a filtration assembly, a UV purification module, a package with an additive and a lid, wherein the filtration assembly contains a filtration material and further wherein, the filtration assembly can contain two or more different filtration materials and further wherein, the UV purification module comprises a UV light source. In a further aspect of the present invention, a UV light source is integrated as part of a filtration assembly. In another aspect of the present invention, an additive a tablet, a capsule or a powder and wherein, an additive, is, without limitation any functional ingredient such as an electrolyte, a vitamin, an amino acid, a flavoring, a performance enhancer, a compound imparting color to a fluid or a salt.

In an aspect of the present invention, a lid has an opening through which an individual is able to consume a fluid. In another aspect of the present invention, a filtration assembly purifies a fluid in a fluid container and/or a UV purification module sterilizes a fluid in a fluid container.

In an aspect of the present invention, a fluid container comprises an outer bottle and an inner bottle, wherein an inner bottle has a filtration assembly at its base with or without a UV purification module as part of the filtration assembly and further wherein, a fluid container comprises an outer bottle and an inner bottle, wherein a tablet storage and dispensing module is attached to the base of the outer bottle for the storage of a package with an additive and a lid on the top of the inner bottle and further wherein, without limitation, the lid includes a flow meter and wherein, without limitation, the flow meter is attached through a straw that extends all the way to the bottom of the inner bottle and further wherein, without limitation, the flow meter does not have a straw, allowing liquid to be drunk by tilting of the bottle. In an aspect of the present invention, a flow meter measures the amount of a fluid and/or the amount of an additive consumed by an individual and wherein, without limitation, the amount of a fluid and/or the amount of an additive consumed by an individual is displayed on a device.

In an aspect of the present invention, a fluid container comprises a filtration assembly comprising a filtration material, a filtration membrane and a UV purification module, and wherein, a UV purification module comprises a UV light source and further wherein, without limitation, a filtration assembly in the base of a fluid container and a UV light purification module in the lid at the top of a fluid container.

BRIEF DESCRIPTION OF THE FIGURES

FIG. 4A depicts a view of a lid from the bottom showing a UV purification module and latches.

FIG. 4B depicts a view of a lid form the bottom wherein the lid includes a straw that inserts into an inner fluid containing chamber of an inner bottle.

FIG. 5A depicts a lid with a flow meter.

FIG. 5B depicts a cross-section of a lid with a flow meter.

FIG. 10E depicts a cross-section view of a filtration assembly with three chambers for a filtration material. FIG. 10F depicts an external view of a filtration assembly with three chambers for a filtration material.

DESCRIPTION

Figure 1:
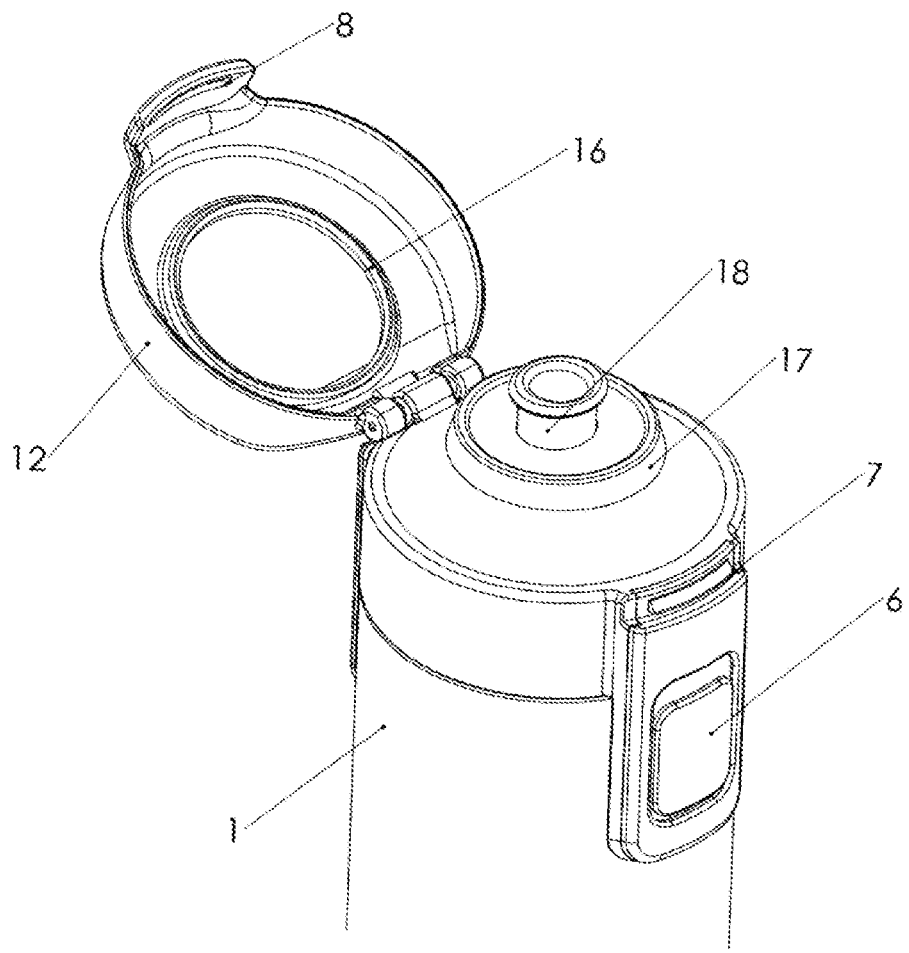
FIG. 1 depicts a fluid container external view from the top with a lid open.

In an embodiment, there is provided a fluid delivery system comprising a fluid container comprised of one or more modules. In an embodiment, the fluid container is comprised of one to four distinct modular components, including, without limitation; (1) a filtration module for removal of pathogens and harmful substances from a fluid source, (2) a UV purification module for emitting ultraviolet (UV) light in a germicidal spectrum for disinfection of a volume of a fluid held in a container, (3) a tablet or powder storage and dispensing module containing an additive package that can be added to a volume of a fluid held in the container, and (4) a lid that includes or does not include a flow meter module that can be used to quantitatively monitor hydration of an individual in real time. Each module can be used in any combination depending on the profile and needs of the user.

The flow meter module measures fluid and additive (if used) intake from a lid and reports the information wirelessly to an individual or a third party. The flow meter in the fluid delivery system can quantitatively measure the supply and intake of electrolytes to the body during activities in real time and is a quantitative solution that addresses fluid and electrolyte intake/loss. The quantitative nature of the flow meter removes guessing on fluid and electrolytes supply from the purview of the user or another third party, such as coaches. Also, as the system quantitatively measures supply and intake, a user or third party can also be alerted to over intake, also known as "water poisoning", which is a potentially fatal disturbance in brain function that results when the normal balance of electrolytes in the body is pushed outside of safe limits (e.g., hyponatremia) by overhydration, i.e., over-consumption of water.

The purification module is comprised of a filtration and/or UV disinfecting module, which can be used singly or in combination. In an embodiment, a filtration module works through reverse osmosis. In an embodiment, it is designed to reduce health hazards from fluid sources that may be contaminated with pathogens or harmful chemical substances. In another embodiment, following filtration of a fluid, an individual is able to add an additive to the filtered fluid, thus obviating any issue related to the removal of an additive during the filtration process, including, without limitation, during consumption of a fluid by an individual. In an embodiment, a UV module is comprised of an LED that can be linked, without limitation, to a PCB with controllers, allowing an individual to sterilize a fluid from any contaminants such as pathogens or harmful substances. The filtration and UV modules can be used in combination to ensure maximal safety of the fluid. Moreover, the PCB can provide an individual with information about the efficiency and life expectancy of a filtration assembly, including, without limitation, providing visual reminders about when to replace the filters.

The tablet storage and dispensing module measures fluid can attach to a fluid container. Such a module can be designed to store several packages of an additive, each used to provide a certain level of an additive to an individual throughout the day.

In an embodiment, a fluid, without limitation is municipal water sources, river waters, oceans, uncarbonated water, carbonated water, purified water and/or an aqueous solution to which additive is added. In an embodiment an additive includes, without limitation, an electrolyte, a vitamin, an amino acid, a flavouring, a performance enhancer, a compound imparting color to a fluid, a salt or any other component that can be added to a fluid. According to the present invention, in an embodiment there is provided a delivery system and method, which measures fluid output from a fluid container and reports the quantity of fluid that is removed from the fluid container to the user. In a further embodiment, the system stores and dispenses a fluid additive, including, without limitation, electrolytes, other additives, flavors and/or performance enhancers to the fluid and measures the fluid output, as well as the fluid additive contained within the fluid, and reports to the user. According to the present invention, there is provided a means to accurately measure the amount of additives taken by an individual who consumes the fluid in which such components are located. According to the present invention, the fluid delivery system comprising a fluid container is able to filter and/or sterilize a fluid.

In an embodiment, a fluid delivery system includes, without limitation, a fluid container comprised of an inner and outer containers. In a further embodiment, a fluid container includes, without limitation a means for measuring fluid output. In an embodiment a fluid container contains a known or measurable amount of a fluid. In an embodiment, a fluid container has an exit port for exit of the fluid from the fluid container to the exterior of the fluid container, and an output device, or flow sensor, which measures flow of fluid from the holding portion of a fluid container out through the exit port. In an embodiment, the exit port is a removable cap, fitting the fluid container such that the cap can be removed and the fluid container can be refilled through the removable cap, but in this instance, the water is not filtered, but it can be sterilized with the UV purification unit. In a further embodiment, an inner fluid container can have an orifice at the bottom of the container base, which can be opened and fitted with a filter module comprised of a replaceable reverse osmosis filter system wherein the filtration assembly is replaced once the filtration material is no longer functioning at a level to provide the filtration level necessary to treat a fluid. In a further embodiment, an inner fluid container can have an orifice at the bottom of the container base, which can be opened and fitted with a UV module comprised of a rechargeable UV sterilization system wherein the UV assembly is replaced once it is no longer functioning at a level to provide the germicidal level necessary to treat a fluid. In a further embodiment, when a UV purification module is configured with a rechargeable battery, the fluid container, including without limitation, an outer bottle, an inner bottle, a filtration assembly and/or a lid may include a port where a plug can be inserted to recharge the battery. An illustrative, non-exclusive example of a suitable port may include a USB (universal serial bus) port, such as (but not limited to) a standard USB port, a mini-USB port, or a micro-USB port. When present, such a port may also be used to communicate with the controller, for example, to program purification devices according to the present disclosure, to update software of purification devices according to the present disclosure. In a further embodiment, an inner fluid container can have an orifice at the bottom of the container base, which can be opened and fitted with a filter and UV module combination, comprised of a replaceable reverse osmosis filter system wherein the filtration assembly can be replaced independently from the UV module once the filtration material is no longer functioning at a level to provide the filtration level necessary to treat a fluid. In another embodiment, a filtration assembly is replaced with a filtration material when the filtration material no longer functions satisfactorily. In this case, without limitation, a filtration material and/or a UV light can be replaced in the filtration assembly and the filtration assembly reattached to an inner bottle.

A removable cap can be made of various materials, including but not limited to BPA-free plastic, plastic, rubber, aluminum, stainless steel, glass, partial glass or plastic, or combinations thereof or any other advanced plastic or material. In an embodiment, a removable cap can have a standard size opening at the base to fit a standard sized fluid container. In an embodiment, different adapters or connectors can be designed and manufactured to fit a standard opening at one end of a removable cap and have various sizes at the other end, capable of fitting other conventional containers or water bottles. In an embodiment, this allows a removable cap to be used with other fluid containers and not be restricted for use with a fluid container herein described.

In an embodiment, a fluid is added by attaching a tube directly to a filter assembly 3 and the water transferred directly into a filtration material 36 and then into an inner chamber of an inner bottle 2. In an embodiment, a tube is rolled securely at the bottom of the base when not in use and can be extended to connect to a fluid source when needed to refill a fluid container with a fluid, whereby the fluid pressure from a faucet or other fluid source enters a filtration assembly 3 from one end and filtered fluid enters the fluid container at the other end. When a fluid container is filled, tubing can be disconnected from a faucet or other fluid source and rolled at bottom of filter assembly 3 and unit can be removed from the fluid containment portion.

In an embodiment, a fluid container is a water bottle or other type of fluid containment device such as a pouch or other type of hydration pack. In an embodiment, a fluid container can be made of various materials, without limitation, plastic (including, without limitation, a BPA-free plastic), glass, plastic with glass-coated interior, metal, composite, ceramic, stone, carbon fiber, cloth, leather and/or other material known to those in the art and/or combinations thereof. In an embodiment, a fluid container is, without limitation, covered with an insulating and/or slip resistant material or other materials, which aid the user in carrying or holding the fluid container. In another embodiment, a fluid container is made mostly of hard plastic, but can contain soft plastic or other material capable of being squeezed and be malleable under pressure when squeezed so as to force fluid from the container. In an embodiment, the location of such soft material should be designed where the fingers and hands typically hold a water bottle. In another preferred embodiment, a fluid container material is transparent so as to allow visual inspection of a fluid inside. In another embodiment, a fluid container material is non-transparent. In an embodiment, a fluid container contains a non-transparent material (aluminum, etc) and a portion of the design includes a transparent material. Inclusion of a transparent material provides, without limitation, an individual to inspect the level and state of the fluid inside. In another embodiment, the bottom/base of a fluid container (on the outside) is made of material that facilitates "sticking" to a surface without slipping. In an embodiment, a material forms a strong seal that unforms when a water bottle is removed using normal force. Such a material may comprise, without limitation, silicone, rubber, or other "sticky" (but not permanent glue) compound.

In an embodiment, an inner bottle and an outer bottle is translucent. In an embodiment, an inner bottle is translucent and an outer bottle is not translucent. In a further embodiment, an inner bottle is not translucent and an outer bottle is translucent. In an embodiment, an inner bottle and an outer bottle is transparent. In an embodiment, an inner bottle is transparent and an outer bottle is not transparent. In a further embodiment, an inner bottle is not transparent and an outer bottle is transparent.

In another embodiment, a fluid container comprises a bottom-fitting unit capable of holding multiple disposable packages for delivering an additive to a fluid container. In an embodiment, a bottom-fitting unit can screw to the bottom of the fluid container and have a rotating base whereby each dispensing cartridge can align with an opening at the bottom of the fluid containment portion, facilitating extrusion of the contents in a package containing an additive into fluid container. In an embodiment, a filtration assembly and a disposable multi-package unit are designed as one, such that, without limitation, it can be activated by pulling on it to open the orifice between a filter and the interior of a fluid container, that once open, the bottom is, without limitation, attached to a fluid source (for instance, without limitation, tap water or other source) via a fluid source faucet, the pressure of the fluid flow from a source faucet will enter a filtration assembly and purified water exits through an exit port into a fluid container. Once filled, a fluid source can be detached and a filter unit put into closed position.

In another embodiment, a package with an additive comprises, without limitation, a material design capable of "accordion style" collapse under pressure from a twisting cap is provided. A package with an additive is able, without limitation, to quantitatively release its contents into an interior of a fluid container. A package with an additive comprises a closed end (such as found in, for instance, without limitation, toothpastes or ointments), which is perforable, or a "curtain" whereupon a protrusion in the cap punctures the thin curtain end, thereby exposing contents of the cartridge into the fluid holder portion of the fluid container.

A package with an additive can be made of various materials. In a preferred embodiment, package with an additive, including, without limitation, a disposable package with an additive comprises, without limitation, a material resistant to contamination with a pathogen or other harmful substance. In an embodiment, a package with an additive includes, but not limited to aluminum, BPA-free plastic, plastic, rubber, stainless steel, or combinations thereof or any other advanced plastic or material. In an embodiment, a package with an additive is disposable and in other embodiments, a package with an additive is refillable. A package with an additive in an embodiment includes a "curtain" that is perforable, and is resistant to contamination with a pathogen or other harmful substance. In an embodiment, a curtain includes, but not limited to aluminum, BPA-free plastic, plastic, rubber, stainless steel, partial glass or plastic, or combinations thereof or any other advanced plastic or material.

A package with an additive includes, without limitation, in a prefilled form, one or more fluid additives, including, but not limited to electrolytes, juices, vitamins, nutrients, antioxidants; natural or synthetic performance enhancers; flavorings, colorings, and combinations thereof. In an embodiment, a disposable package with an additive can be dispensed into the fluid containment portion, providing a refreshing drink.

In an embodiment, a pathogen is, without limitation, a bacteria, a virus, a parasite, a prion, a cyst, or other biologic agent capable of infecting an individual. In an embodiment, a harmful substance is, without limitation, a carcinogen, a teratogen, a mutagen or other non-biologic agent capable of harming an individual.

In an embodiment, a fluid container further contains a cartridge for delivery of additives. In an embodiment, a package containing an additive is perforable, and/or disposable and/or squeezable and releases its contents into the fluid container upon application of pressure.

In an embodiment, an additive replenishes at least 1%, at least 2%, 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100% of the electrolytes and/or salts and/or vitamins lost by an individual resultant from physical exertion, including, without limitation exercise. In an embodiment, exercise includes, but is not limited to, running, jogging, weight lifting, playing sports, cycling, aerobic exercise, karate, boxing and any other physical exertion undertaken by an individual.

A fluid container can be made of various shapes comprising: round, oval, rectangular, or combinations thereof depending on design such as oval at the bottom, turning round towards the top. A fluid container can come in different sizes from small to large. In an embodiment, a preferred size for a fluid container is at least 10 mls, at least 15 mls, at least at least 20 mls, at least 25 mls, at least 30 mls, at least 35 mls, at least 40 mls, at least 45 mls, at least 50 mls, at least 55 mls, at least 60 mls, at least 65 mls, at least 70 mls, at least 75 mls, at least 80 mls, at least 85 mls, at least 90 mls, at least 95 mls, at least 100 mls, 110 mls, at least 120 mls, at least 130 mls, at least 150 mls, at least 150 mls, at least 160 mls, at least 170 mls, at least 180 mls, at least 190 mls, at least 200 mls, at least 225 mls, at least 250 mls, at least 275 mls, at least 300 mls, at least 325 mls, at least 350 mls, at least 375 mls, at least 400 mls, at least 425 mls, at least 450 mls, at least 475 mls, at least 500 mls, at least 550 mls, at least 600 mls, at least 650 mls, at least or more 700 mls, at least 750 mls, at least 800 mls, at least 850 mls, at least 900 mls, at least 950 mls, at least 1000 mls or more. In an embodiment, a fluid container is used by an individual, without limitation, in athletic activities, including, without limitation, running, biking, in-line skating, triathlons and adventure racing. Other sizes can be used in, for example, without limitation, environments suitable towards more casual consumers or home needs.

In an embodiment, a fluid container comprises a removable cap. In a further embodiment, a removable cap is, without limitation, a squeeze unit (cap twist) that is attached to an open end of a fluid container. In an embodiment, a removable cap includes an additive that is released upon closure of the removable cap as the force releases the contents of a package with an additive to the interior of a fluid container. According to another embodiment, the opening end at the base of a removable cap is a twist cap design which contains a piercing protrusion capable of rupturing the opening end of a package containing an additive. In an embodiment, a twist cap is designed so that an opening of variable size can be achieved. In an embodiment, if no package with an additive is fitted inside a removable cap, a removable cap is able to achieve a closed position, preventing any leakage of fluid from the fluid container. In another embodiment, the contents of a package with an additive can be released into the interior of a fluid container via different mechanisms, including, without limitation, a mechanical lever whereby cartridge can be fitted to the cap and contents released in the container via a lever arm at the base of the cap, such that opening the lever allows a package with an additive to be fitted, and closure of a lever will release the contents of a package with an additive inside a fluid container. In other embodiments, a mechanism and method of releasing contents of a package with an additive comprises, without limitation, variations of the above mechanisms or similar methods known in the art, mechanical or otherwise.

In another embodiment, a fluid container comprises, without limitation, a squeeze unit designed to be on the fluid container through a mechanical arm on the side of a containment portion. In another embodiment, a squeeze unit is via a connection to a fluid container, with a connection comprising an opening to the inside of a fluid container and on the side whereby the opening to a fluid container is equipped, without limitation, with a small piercing protrusion to fit a disposable/ squeezable cartridge, facilitating puncture via a twist-like screw.

In an embodiment, a fluid container like that of FIG. 1 comprises an outer bottle 1 to which is attached a cap, and further wherein, is attached a lid. A lid is further comprised of an upper lid 12 that opens to expose the inside of a pour mouth seal 16 and a pour mouth piece 17 and a pull up straw mouthpiece that a user can use to remove a fluid from a fluid container, for example, without limitation, by sucking a fluid out through a straw and when pressed down, in an embodiment, forms a seal against the flow meter housing. A lid can also include a lid latch (female) 8 that allows the lid to remain closed by engagement with the lid latch (male) 7 that is attached to the lower portion of the lid. A fluid container also includes a release button or slide 6 to disengage the latch and allow the spring loaded lid to open.

In an embodiment, a fluid is added to an outer bottle 1 from, without limitation, a faucet, a hose, a water fountain, a cup, a bottle, a glass or other sources. In an embodiment, a filter assembly 3 functions by providing a clean, filtered and/or sterile fluid in a fluid container to an individual.

Figure 2:
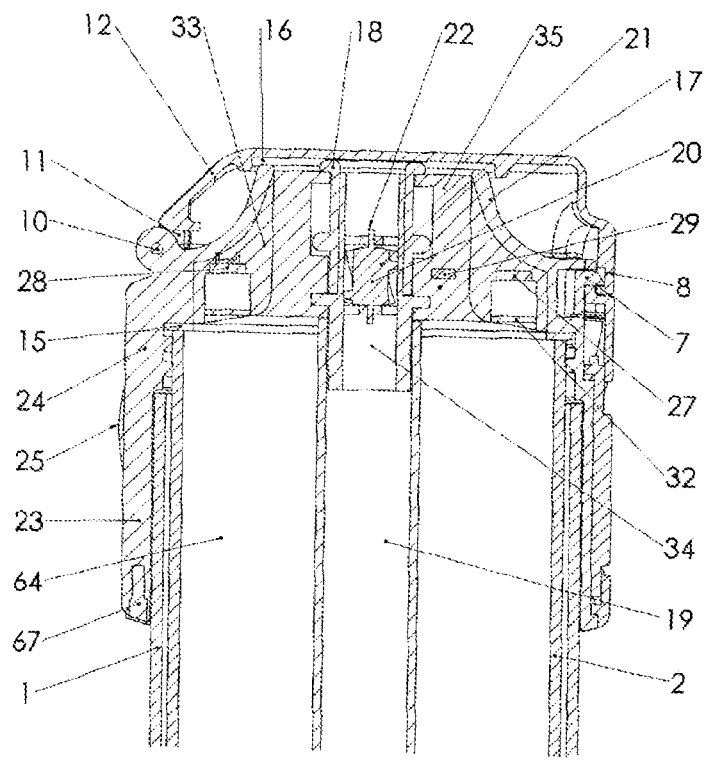
FIG. 2 depicts a fluid container cross-section view of the top with a lid closed.

FIG. 2 discloses a fluid container comprising a cross-section of a lid and an upper body of an outer bottle 1 and inner bottle 2. An inner bottle 2 contains an inner bottle reflective surface 64 that is coated with a reflective material in order to minimize the amount of energy lost from light emitting diodes (LED) that emit ultraviolet (UV) radiation. In an embodiment, a reflective surface is defined by a layer of reflective material, such as (but not limited to) aluminum, stainless steel, biaxially-oriented polyethylene terephthalate (boPET, e.g., MYLAR® film), and other metals and nonmetals. In an embodiment, the reflective surface results in the UV radiation reflecting, including, without limitation, bouncing off the reflective surface to ensure that the UV radiation continues to penetrate the fluid in the inner bottle 2. A straw 19 may or may not be located within the inner bottle 2. The straw 19 opens up into a passage through a lid that a fluid can pass. The passage can be open so that the fluid is dispensed directly to an individual or the passage can contain a fluid flow meter that measures the amount of fluid and additives taken in by an individual. The fluid flow meter is comprised of a flow meter housing 34 that houses the flow meter impeller 20, a flow meter impeller magnet 21 and a flow meter impeller dowel pin 22. The flow meter impeller 20 is used to measure the amount of a fluid and/or an additive that is removed from the inner bottle 2 to an individual. In an embodiment, the flow meter impeller 20 rotates as a fluid passes through a flow meter housing and houses a magnet that can be detected by a magnetic sensor for the purpose of measuring rotation speed and in an embodiment, without limitation, a flow rate. In an embodiment, a flow rate impeller is constructed of stone, plastic, metal, carbon composite, ceramic or other material capable of being shaped into a form capable of measuring fluid flow. In an embodiment, the rate of flow is measured by attaching a magnet to a flow meter impeller 20 that is detected by a magnetic sensor 29. In an embodiment, the flow is measured by attaching a tag capable of being detected by an optical detector or a tag capable of contacting a detector that measures each rotation of a flow meter impeller 20 to determine the amount of fluid and/or additives removed from an inner bottle 2 by an individual. A flow rate impeller 20 can spin on its access as a fluid flows from and is removed from an inner bottle 2 to the exterior through straw 19 and pull up straw mouthpiece 22.

In a further embodiment, a flow meter includes a flow rate impeller 20 that spins as a fluid passes through it from the fluid container to an exit port. In an embodiment, a flow rate impeller 20 can be constructed of any durable material, including plastic, glass, metal, carbon fiber or any combination thereof. A flow rate impeller 20 contains a means for detection that allows a detection device to identify a single rotation of a flow rate impeller 20 and to allow for the counting of the total number of rotations of flow rate impeller 20 and an accurate measurement of the amount of fluid transferred from the interior of the fluid container through the exit port. In an embodiment, a means of detection is a piece of metal on a flow rate impeller 20 that is detected by a metal detector. In a further embodiment, a means of detection is a bar code or other imprinted code or design that is detected by an optical detector. In another embodiment, a means of detection is a magnet on a flow rate impeller 20 that is detected by a detector. Other means of detection will be known to ones of skill in the art.

In an embodiment, a flow meter has, without limitation, a micro mechanical cantilever engineered inside the tip of a cap, including, without limitation, a removable cap that is capable of measuring liquid flow. In another embodiment, a flow meter is comprised, without limitation, of an electromechanical unit or a microfluidic channel system embedded, without limitation, inside the tip of a cap or within a cap that is capable of measuring liquid flow. In another embodiment, a flow meter comprises a combination of the above or other mechanisms known or novel in the art.

In an embodiment, a fluid container includes a device for reporting and/or transmitting data regarding flow of liquid from a flow meter. In a further embodiment, a device is capable of recording data regarding flow of liquid from a flow meter.

In an embodiment, a flow meter is capable of providing accurate measurements of the amount of a fluid and/or an additive removed from the interior of an inner bottle 2. In an embodiment, a flow meter measurement of the amount of a fluid and/or an additive removed from the interior of an inner bottle 2 is at least 50% accurate, 55% accurate, 60% accurate, 65% accurate, 70% accurate, 75% accurate, 80% accurate, 85% accurate, 90% accurate, 91% accurate, 92% accurate, 93% accurate, 94% accurate, 95% accurate, 96% accurate, 97% accurate, 98% accurate, 99% accurate, 99.5% accurate, 99% accurate, or 100% accurate.

Figure 13:
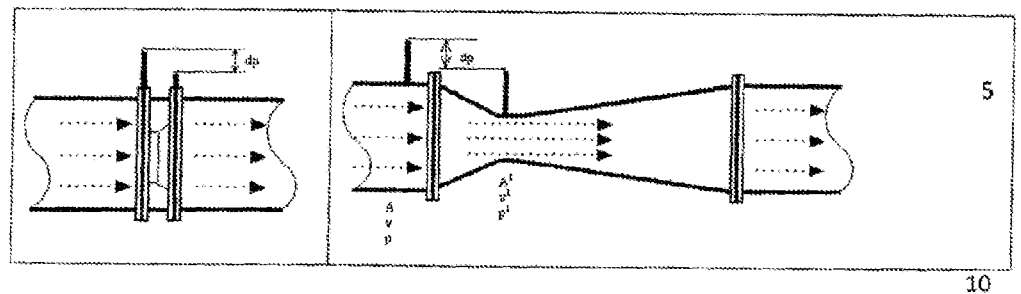
FIG. 13A depicts an Orifice Plate design.
FIG. 13B depicts a Venturi Meter design that includes mechanical cantilevers.

In an embodiment, FIG. 13 depicts an Orifice Plate (FIG. 13A) or Venturi Meter (FIG. 13B) design that includes mechanical cantilevers (not shown here) measuring the delta p, whereby the differential force from each cantilever (connected to an electronic measuring device) will be recorded in real time allowing the data/results to be transmitted wirelessly.

The amount of a fluid and/or an additive that flows past a fluid flow meter can be monitored by a device that is attached directly to a fluid container or is wireless. In an embodiment, a device is attached directly to a fluid container, including, without limitation at a lid, on or in an outer bottle 2, on or in an inner bottle 2, including, without limitation, on a filtration assembly 3. In an embodiment a device provides information to an individual including, without limitation, the amount of fluid ingested by an individual and the amount of additives ingested. In an embodiment, a device includes a display that provides the information to an individual. In a further embodiment, a display is located on a fluid container. In another embodiment, a display is part of a device not attached to a fluid container, including, without limitation, a device connected to a fluid flow meter through a wire between the fluid flow meter and the device or a device is wirelessly connected to a fluid flow meter. In an embodiment, a device not attached to a fluid container includes wired devices: a) that plug into a fluid container and can be unplugged when not in use; b) that plug into a fluid container and cannot be unplugged; and/or, are attached to a fluid container. In an embodiment, without limitation, a device can be a wireless, including, without limitation a beeper, a smart phone, a tablet and/or a computer.

A lid comprises a dangler battery housing 23 and a dangler UV activation button 25 that turns on the UV light source 28, including, without limitation, a LED, a fluorescent bulb, a black light, short wave UV lamp, gas-discharge lamp and/or UV laser. In an embodiment, a UV activation button includes, without limitation, a light to inform an individual that a UV light has been and/or continues to be active. In an embodiment, a battery can be rechargeable or not and/or can be a lithium or nickel metal hydride battery and/or can be AA, AAA, C, D or other battery type. A lid further comprises a dangler battery housing connector 67 that allows a rechargeable battery to be recharged by a connector, including a standard cell phone connector, a USB, a micro USB and/or a computer adaptor. In an embodiment, a fluid container contains a device to identify the time until a UV light source has until it no longer functions, including a numerical indicator and/or a color indicator.

In an embodiment, a rechargeable battery is recharged through the attachment of a plug that inserts into a socket in an outer bottle or an inner bottle, wherein the plug is attached to an electrical source through a wire. An electrical source, includes, without limitation, a wall socket, a car electrical plug, for instance, without limitation, a car lighter, a portable recharger (including, without limitation, those sold by MORPHIE™), an electrical power generator and/or any other source of electricity. In a further embodiment, a rechargeable battery is recharged by placing a battery containing outer bottle and/or inner bottle on a battery charger plate.

A lid further comprises a lid hinge dowel pin 10 and a lid spring 11. A lid 12 swings open when the release button 6 is pushed in to disengage the lid latch female 8 from the lid latch male 7 and allows the spring loaded lid to open. In an embodiment, a lid can contain a UV light source or not. In an embodiment, a UV light source 28 faces the inside of the inner bottle 2 and is covered by a UV light lens 32 and resides in UV light housing 33. A UV light lens 32 and UV light housing 33 act to protect a UV light source from being exposed to a fluid within the inner bottle 2. In an embodiment, where a UV light is an LED, the lid can contain a UV LED PCB 27 that houses a UV LED bulb 28 and an optional magnetic sensor 29. A UV light source 28, including without limitation, a UV LED bulb is connected to a UV light PCB 27 that houses the UV bulb 28 and an optional magnetic sensor 29 that obtains its power either from a battery located on the UV light PCB 27 itself or from a battery located in the dangler lid assembly 23.

Upon attachment of a lid to an inner bottle 2 a seal is formed through a lid base seal 15 that keeps a fluid from leaking out of an inner bottle 2. A lid base seal 15 can be made of any material that is capable forming a seal between the lid and the inner bottle 2, including, without limitation, rubber, silicone, plastic, metal, carbon, ceramic, carbon, composite and/or any other material capable for forming such a seal.

Figure 3:
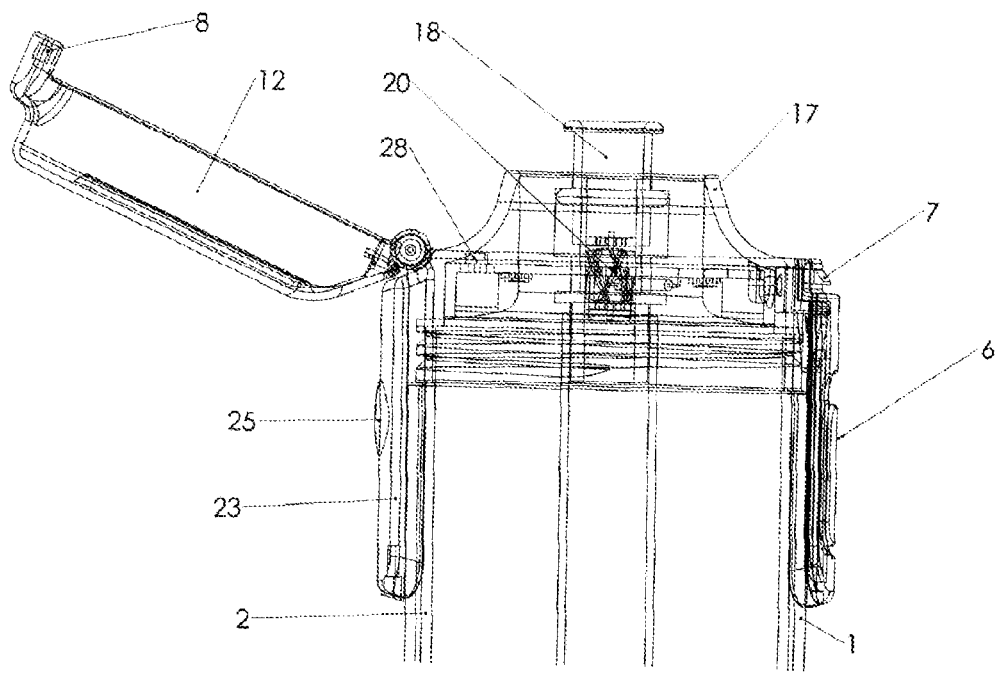
FIG. 3 depicts a fluid container cross-section view of the top with a lid open.

FIG. 3 comprises a cross section of a fluid container comprising an outer bottle 1 and an inner bottle 2 connected to a lid assembly. In FIG. 3 a lid is open exposing a pull-up straw mouthpiece 18 through which an individual is able to remove a fluid, for example, without limitation, like an individual sucks a fluid through a straw. When pressed down in the non-open position, the pull-up straw mouthpiece 18 forms a seal against the flow meter housing.

FIG. 4a comprises a view of a lid without a straw 19 that shows the portion of a UV light housing 33 that faces into the fluid containing portion of an inner bottle and the exposed portion of the UV lens 32 that covers the UV light source. FIG. 4b comprises a lid similar to that in 4a, except the lid in 4b contains a straw 19 that extends into the interior of the inner bottle and through which a fluid can flow to the exterior, for example, without limitation, as an individual sucks a fluid through a straw.

FIG. 5a comprises a view of a lid that shows the portion of a UV light housing 33 that faces into the fluid containing portion of an inner bottle and the exposed portion of the UV lens 32 with a unique lid base 14. FIG. 5b comprises a cross section of the lid in FIG. 5a. In a lid as depicted in FIG. 5a, a PCB battery 31 is located within the lid instead of, or along with, a battery 24 that is dangler battery housing 23. In an embodiment, a battery is located in a dangler batter housing 23, a lid, a filter assembly 3, in the body of an inner bottle 2, in the body of an outer bottle 1, attached to the inside of a bottle and or floating free in the inner portion of a bottle.

Figure 6A:
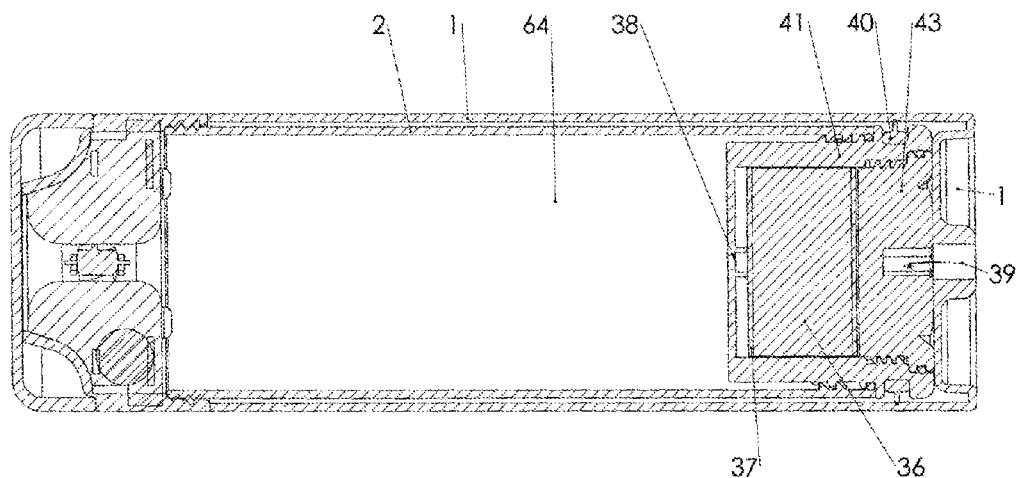
FIG. 6A depicts a cross section of a fluid container showing a lid with a flow meter, a battery and a UV purification module and a filtration assembly.

FIG. 6a comprises a cross section of a fluid container comprising a lid with a UV light source 28 and a base with a filter assembly 3. A filter assembly 3 is at the base of an inner bottle 2, which is located within an outer bottle 1. A filter assembly 3 is comprised of a filtration material 36. In an embodiment, filtration material 36 is, without limitation, carbon, sepharose, sephadex, sand, glass, fiberglass, cotton, polyester, ceramic, ceramic sand, porous ceramic balls, porous ceramic, KDF, KDF55, activated carbon, porcelain and/or FMS. In an embodiment, a filtration material has germicidal and/or antimicrobial effect on a pathogen and/or a harmful substance in a fluid. In an embodiment, a filtration material includes silver, brass and/or copper-alloys. A filtration material 36 is enclosed within a filter upper media enclosure 41 and filter enclosure cap 43. The filtration material 36 is covered by a filtration membrane 37 that filters out contaminants from a fluid and also prevents filtration material 36 from escaping the filter assembly.

In an embodiment, the amount and number of different filtration materials used in a filtration assembly is based on the intended use of an individual. For instance, an individual that desires to filter a fluid from a home water source, like a faucet or a public water fountain, may only require a single filtration material to adequately purify the fluid. In a different instance, an individual traveling to a country known to have E. coli or other bacteria, parasites, viruses or other pathogens known to exist in a fluid supply may want to use two or more filtration materials in a filtration apparatus to ensure removal of the E. coli or other bacteria, parasites, viruses or other pathogens from a fluid. In either case, an individual may also use a UV light source along with the use of a filtration material.

In an embodiment, a fluid pathway into and out of a filter assembly 3 includes a check valve. In a further embodiment, a check valve is a one way check valve that allows fluid to pass in one direction and not back in the direction it came. In another embodiment, a check valve is a two way check valve that allows fluid t pass in one direction and then back in the direction it came. In an embodiment, a check valve is sprint actuated. In a further embodiment a check valve is actuated by a gasket, including, without limitation a rubber gasket or a flexible plastic gasket. In an embodiment a check valve keeps a fluid from passing back through a pass it has already come through, including a filtration assembly 3, or a straw 19 or other passage in a fluid container.

To prevent fluid from passing back through a flow meter, a check valve is located between the flow meter and the interior of the fluid container. In an embodiment, a check valve is a clack valve, a non-return valve or one-way valve that is a mechanical device that generally allows fluid for flow through it in only one direction. A check valve can comprise, without limitation, a ball check valve, a diaphragm check valve, a swing check valve, a tilting disc check valve, a swing check valve, a stop check valve, a lift check valve, an in-line check valve and/or a duckbill check valve. In an embodiment, a check valve can be made of flexible elastomeric material, food grade silicone, rubber, carbon, polymer, ceramic, glass or other material capable of functioning as a check valve. In an embodiment, a check valve comprises one check valve. In a further embodiment, a check valve comprises two or more check valves, wherein, without limitation, the check valves are in line or set up in a single plane. A check valve includes, but is not limited to a two-port valve, wherein a port allows a fluid to enter and a second port allows for a fluid to leave. In a further embodiment, a check valve has a cracking pressure such that the upstream pressure is sufficient to open the valve when fluid passes through, but not so much pressure that fluid is able to return through the valve. One of skill in the art will understand how to determine the specific cracking pressure of a check valve. In an embodiment, the check valve allows for fluid flow in one direction. In a further embodiment the fluid flow through the check valve is from the interior of the fluid container, past the flow meter and then through the exit port. The use of the check valve prevents fluid from passing back through the flow meter, allowing for an accurate measurement of the amount of fluid that passes through the exit port.

In an embodiment, an inner bottle has two or more check valves with one or more located in a lid and one or more located in the base. In an embodiment, one or more check valves in the base of an inner bottle are located in a filtration assembly. In an embodiment, an outer bottle has at least one check valve, that is without limitation, is located in the base. In a further embodiment, a filtration assembly and/or an inner bottle has one, two, three, four, five, six, seven, eight, nine, ten or more check valves located in its base. In a further embodiment, a lid has one, two, three, four, five, six, seven, eight, nine, ten or more check valves located in its base. In another embodiment, an outer bottle has one, two, three, four, five, six, seven, eight, nine, ten or more check valves located in its base.

In an embodiment, a filtration assembly contains one or more check valves at the top of the filtration assembly that allows a fluid that has passed through a filtration material to flow into the inner chamber of an inner bottle where a fluid is stored until it is consumed by an individual. The check valve opens when the inner bottle is pressed down into a fluid and shuts when no more fluid is flowing through the filter assembly. When the check valve at the top of the filtration assembly shuts, fluid in the inner chamber of an inner bottle is not able to flow back into the filtration material.

In an embodiment, a check valve can be removed from an outer bottle, an inner bottle, a filtration assembly or a lid for cleaning and/or replacement. In another embodiment, a check valve is not removable from an outer bottle, an inner bottle, a filtration assembly and/or lid.

In an embodiment, an inner bottle and/or a filtration assembly contains one or more check valves at the base that allows a fluid that is unfiltered to pass into the filtration material. The check valve opens when the inner bottle is pressed down into a fluid and shuts when no more fluid is flowing through the filter assembly. When the check valve at the top of the filtration assembly shuts, fluid in the inner chamber of an inner bottle is not able to flow back into the filtration material.

In a further embodiment, an outer bottle contains one or more check valves. In an embodiment, a check valve on the outer bottle prevents a vacuum from forming when you try to pull out an empty inner bottle for refill after an individual has consumed a fluid in the inner bottle.

In an embodiment, a check valve functions in a manner similar to that of a bicycle air pump where a piston seal works as a one way valve. In this embodiment, during compression, the lip seal forces water down like a piston and then during removal, the piston seal deflects, allowing a vent to allow an inner bottle to be removed.

In another embodiment, a vented seal is created by a simple surface interrupt, that allows a standard o-ring to seal when an inner bottle is pushed and when an inner bottle is pulled, the o-ring slides to the other side of a groove, a vent is achieved.

In a further embodiment, a one way check valve is located at the bottom of an outer bottle and the check valve opens when an inner bottle is pulled out of and removed an outer bottle. When no pressure is applied through either the removal or insertion of an inner bottle, the check valve seals.

In an embodiment, a small diameter channel acts as a capilary path for a fluid to travel. In this embodiment, each time a fluid is pushed through a filtration assembly to fill an inner chamber of an inner bottle, a capilary chamber is filled incrementally. In this embodiment, as an example, during one single compression and fill, a capilary may advance 3 degrees if orientated circumferentially along a filtration assembly. In an embodiment, a capilary can also be in a vertical or horizontal orientation. In an embodiment, for example, after 50 fills a capilary would show as full indicating time to replace.

In an embodiment, when a UV light purification module is located in a filtration assembly, such unit is activated by an individual by mechanically toggling through a waterproof switch mounted inside the filter module. In this embodiment, an external button passes from the outside of an outer bottle to the inside of an inner bottle and the switch is sealed water tight. In a further embodiment, a switch to activate a UV light purification module includes a safety to prevent a unit from being accidentally activated. In an embodiment, and without limitation, a safety can include a mechanism that requires an individual to twist and/or push a button and/or knob and/or using a safety that requires an individual to push and/or twist a button and/or a multiple times. For example, and without limitation, 1 time, 2 times, 3 times, 4 times, 5 times, 6 times, 7 times, 8 times, 9 times, ten times or more. In a further embodiment a safety to prevent the accidental activation of a UV light purification module is through a mechanical cover and/or other form of blocking access to a button and/or a knob.

Figure 6B:
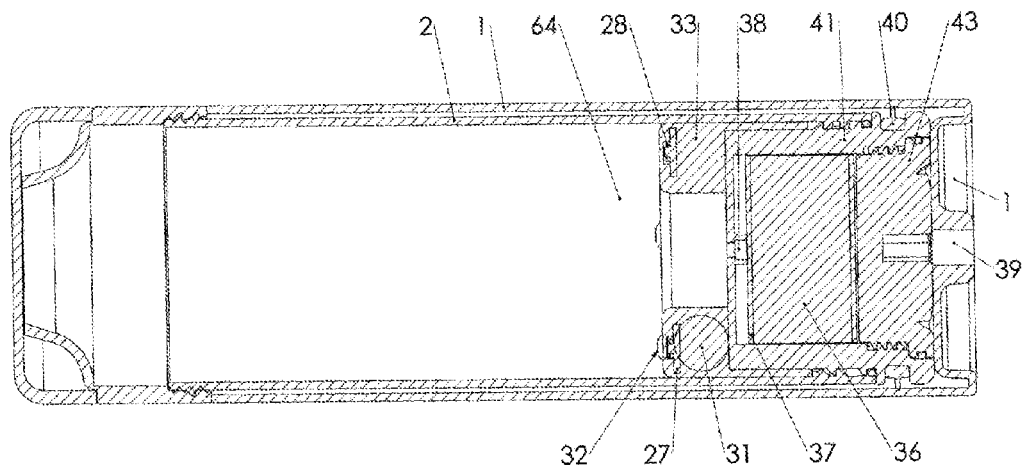
FIG. 6B depicts a cross-section of a fluid container showing a lid and a filtration assembly with a battery and a UV purification module.

FIG. 6b comprises a cross section of a fluid container comprising a filtration module fitted with a UV light source module. A PCB battery 31 is located in the body of the filter assembly and is connected and powers UV light sources 28 that at its base has a UV light source PCB 27 and that is covered by UV light source lens 32.

Figure 7A:
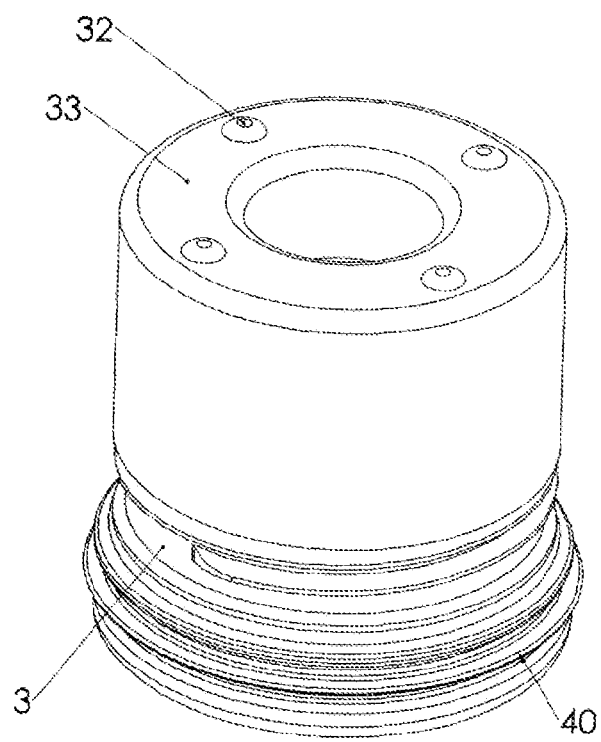
FIG. 7A depicts an external view of a filtration assembly with a UV purification module.
Figure 7B:
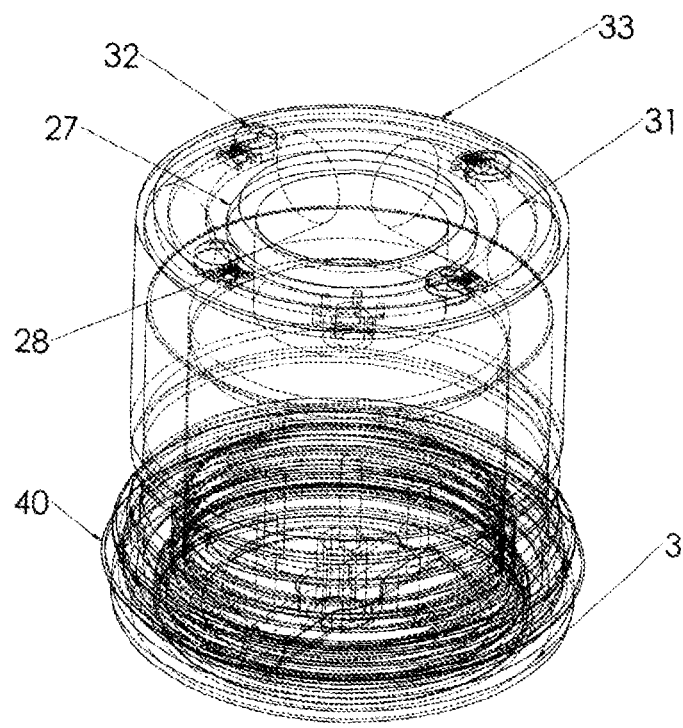
FIG. 7B depicts an internal view of a filtration assembly with a UV purification module.

FIG. 7a shows a filtration assembly with a UV light source within. The filtration unit includes a UV light lens 32 attached to a UV light housing 32. FIG. 7b shows the internal schematics of the filtration assembly of FIG. 7a. Included within the filter assembly is PCB battery 31 and UV light source 28.

Figure 8A:
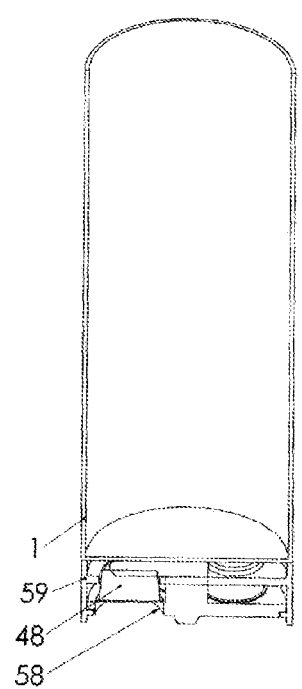
FIG. 8A depicts a cross-section of a fluid container with a module containing a package with an additive.
Figure 8B:
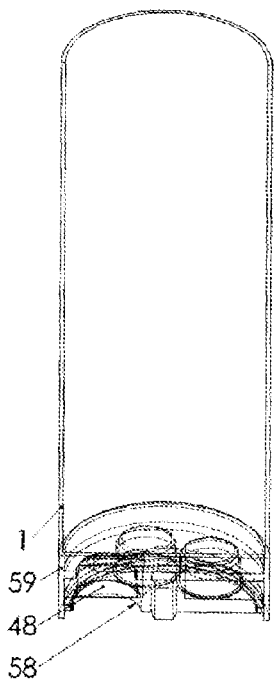
FIG. 8B depicts a cross-section of a fluid container with a module containing a package with an additive.
Figure 8C:
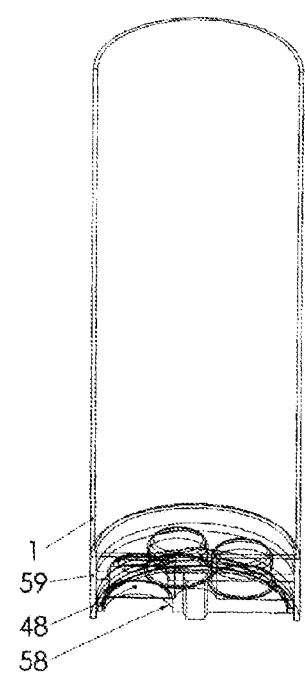
FIG. 8C depicts a cross-section of a fluid container with a module containing a package with an additive.

FIGS. 8a-c shows a cross section of an outer bottle 1 wherein at the base of the bottle is a chamber containing an additive. In an embodiment, the additive can be in the form of a powder, a liquid and/or a sold. In another embodiment, the additive can be contained within a capsule, a tablet and/or a package. In a further embodiment, a package is comprised of paper, aluminium, foil, plastic and/or a composite. In an embodiment, the additive is in a sealed powder cup 48. The sealed powder cup 48 that is contained in powder dispenser—rotating ring 59 and exits through powder dispenser—ejection hole. Following dispensation, the sealed powder cup 48 is opened and the contents poured into the fluid in the inner bottle.

Figure 9A:
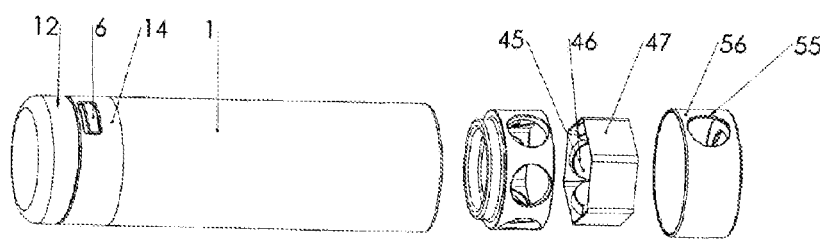
FIG. 9A depicts an external view of a fluid container and the components of a module containing a package with an additive.
Figure 9B:
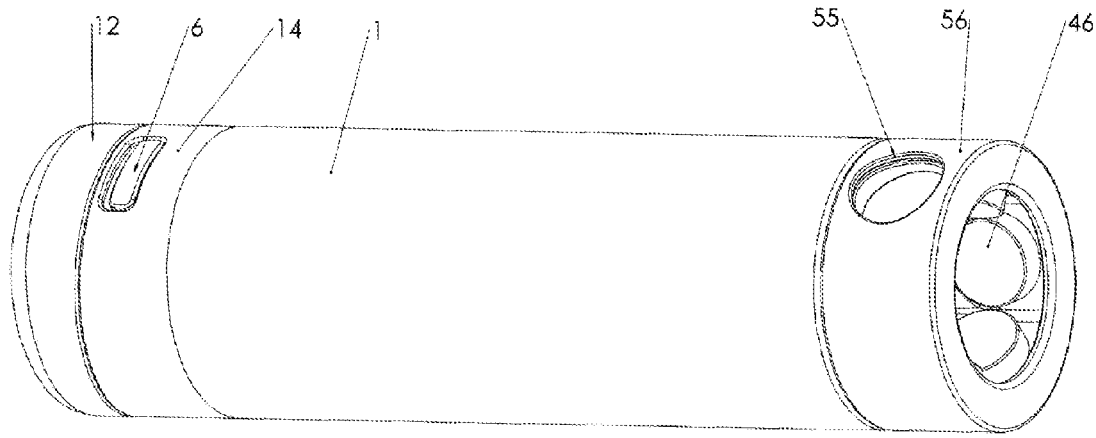
FIG. 9B depicts an external view of a fluid container and a module containing a package with an additive.

FIGS. 9a and 9b depict a fluid container that includes an additive dispensing system at its base. The additive dispensing system comprises a tablet 45 that includes an additive that is enclosed in a tablet blister pack 46. The tablet blister pack 46 is a disposable and replaceable housing for a tablet 45. In an embodiment, the tablet blister pack 46 maintains the freshness of the tablet and keeps it free from contaminants. The tablet blister pack 46 is stored in a tablet dispenser rotating ring 56. A tablet 45 is dispensed from the table dispenser rotating ring 56 through the table dispenser hole 55. The mechanism of dispensation of a tablet 45.

In an embodiment, a package containing an additive is in the form of a tablet that is, without limitation, present in a scored blister pack that is located in a module that is attached to the base of an outer bottle of a fluid container. In an embodiment, a blister pack contains 2, 3, 4, 5, 6, 7, 8, 9, 10 or more packages containing an additive, including, without limitation a table. In an embodiment, the module is twisted/rotated in a counter-clockwise (or other) direction and as the module is moved, a side bar squeezes the blister, pushing the tablet out from the side of the module and into the reach of an individual who then takes the tablet and drops it into the inner bottle of a fluid container with the filtered fluid. The individual shakes the bottle to dissolve the table and the fluid is now ready for an individual to consume.

In a further embodiment, a package containing an additive is in the form of a powder that is, without limitation, present in a storage pouch that is located in a module that is attached to the base of an outer bottle of a fluid container. In an embodiment, a storage pouch contains 2, 3, 4, 5, 6, 7, 8, 9, 10 or more individual pouches containing an additive, including without limitation an powder. In an embodiment, a module is rotated a counter-clockwise (or other) direction, until the opening at the bottom of the module is aligned with each powder pack and when aligned, the pouch is dispensed from the bottom of the module into the reach of an individual who then takes the pouch, lifts a flap that exposes the powder and pours the powder into the inner bottle of a fluid container with the filtered fluid. The individual shakes the bottle to dissolve the table and the fluid is now ready for an individual to consume.

Figure 10A:
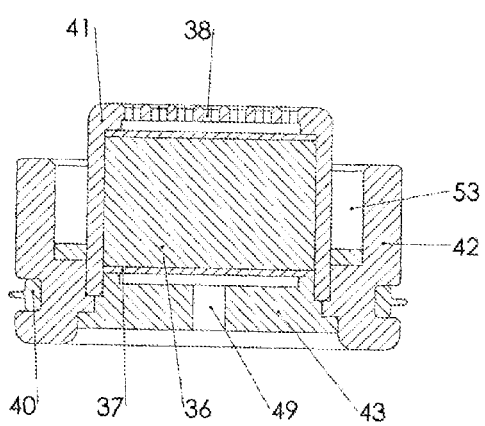
FIG. 10A depicts a cross-section view of a filtration assembly with a single chamber for a filtration material.
Figure 10B:
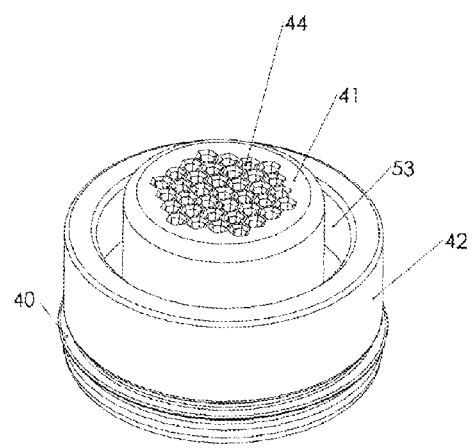
FIG. 10B depicts an external view of a filtration assembly with a single chamber for a filtration material.
Figure 10C:
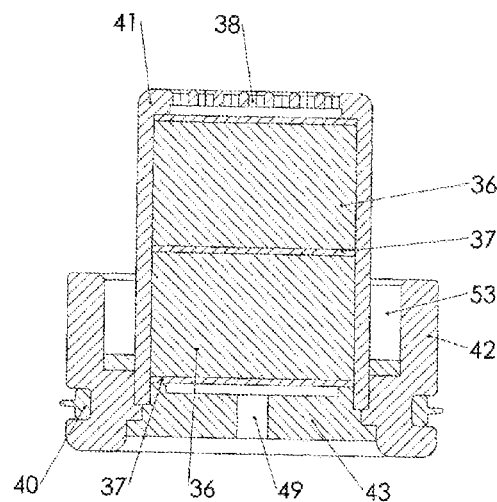
FIG. 10C depicts a cross-section view of a filtration assembly with two chambers for a filtration material.
Figure 10D:
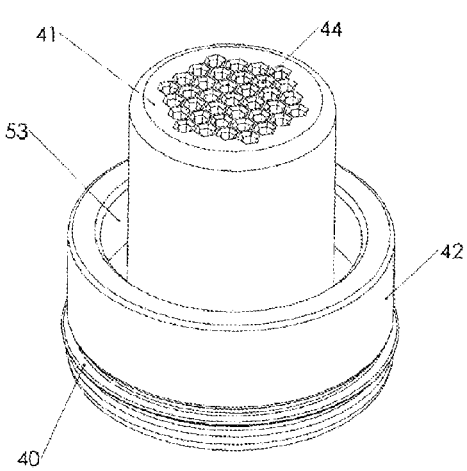
FIG. 10D depicts an external view of a filtration assembly with two chambers for a filtration material.

FIGS. 10a-10c provide an exterior view and cross section view of a filter assembly 3 wherein the filter assembly 3 contains one (FIG. 10a), two (FIG. 10b) and three (FIG. 10c) separate locations for the storage of a filtration material 36. In an embodiment, a filter assembly 3 contains four, five, six, seven, eight, nine, ten or more separate locations for the storage of a filtration material 36. In another embodiment, a filtration material 36 in each location is the same filtration material 36. In an embodiment, a filtration material 36 in each location is a different filtration material 36. In a further embodiment, a filtration material 36 in two or more locations are the same. In an embodiment, a filtration material 36 in two or more locations are different.

Figure 14:
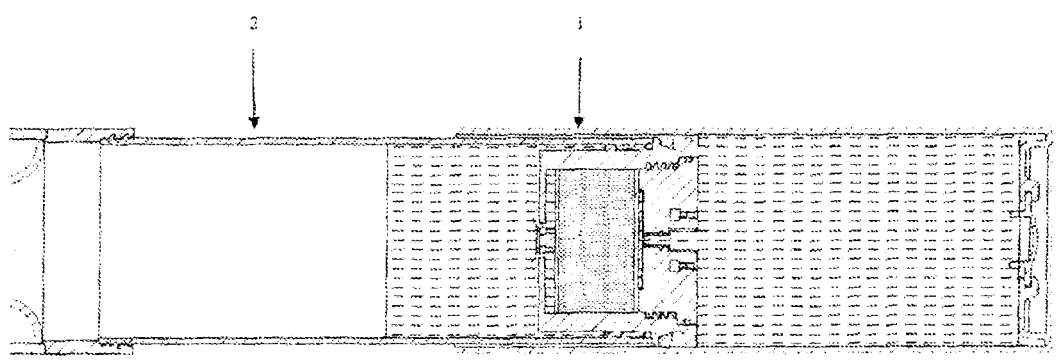
FIG. 14 depicts fluid flow in a fluid container as an inner bottle is pushed into an outer bottle. A fluid is depicted as short wavy lines.

FIG. 10a depicts a filtration assembly 3 with a single chamber for a filtration material 36. The filtration assembly 3, which is placed into an inner bottle 2 includes a filtration material 36. The filtration assembly 3 is attached to the inner bottle 2 through threads 53 that allow the filtration assembly to be attached to an inner bottle 2. In an embodiment attachment is, without limitation, through a thread that screws into an inner bottle 2, through a clip that attaches the filtration assembly to an inner bottle 2, through an adhesive that that attaches the filtration assembly to an inner bottle 2, of through any other means known to one of skill that can attach a filtration assembly 3 to an inner bottle 2. A filtration material 36 is kept within a filter assembly through the use of a filtration membrane 37 that can also function to filter contaminants out of a liquid. An inner bottle 2 includes a bottle dynamic seal 40 that seals the inner bottle 2 to the outer bottle 1 at the bottom of the outer bottle 1 ensuring that as the inner bottle 2 is pushed into the inner bottle 1 (FIG. 14) and the fluid in the outer bottle 1 is forced through the filter inlet hole 49 that is part the filtration assembly located at the base of the inner bottle 2, through the filtration membrane 37 and into the filtration material 36. The filtration assembly includes a filter enclosure cap 43 that keeps the filtration membrane 37 in place and a filter upper media enclosure 41 that houses the filtration material 36 and the filtration membrane 37. The filter upper media enclosure 41 can be of various heights and can hold a variety of filtration material 36. In an embodiment, a filter upper media enclosure 41 is, for e.g. without limitation at least 0.5 inches high, at least 1 inch high, at least 1.25 inches high, at least 1.5 inches high, at least 1.75 inches high, at least 2 inches high, at least 2.25 inches high, at least 2.5 inches high, at least 2.75 inches high, at least 3 inches high, at least 3.25 inches high, at least 3.5 inches high, at least 3.75 inches high, at least 4 inches high, at least 4.25 inches high, at least 4.5 inches high, at least 4.75 inches high, at least 5 inches high, at least 5.25 inches high, at least 5.5 inches high, at least 5.75 inches high, at least 6 inches high, at least 7 inches high, at least 8 inches high, at least 9 inches high, at least 10 inches high or more. An outlet of a fluid from a filtration assembly occurs through pores that can be of any shape and size. In an embodiment, the pores are circular, triangular, hexagonal, tetragonal, square, rectangular, ovoid, octagonal or any other shape through which a fluid can pass. In an embodiment, a pore is in the shape of a hexagon and the pores constitute a honeycomb shape.

FIG. 10b depicts a filtration assembly 3 with two storage compartments for storage of a filtration material 36. FIG. 10c depicts a filtration assembly 3 with three storage compartments for storage of a filtration material 36. In an embodiment, a filtration assembly 3 is disposable. In another embodiment, a filtration membrane 37 and/or a filtration material 36 are disposable and are replaced and the filter assembly reused. In an embodiment a filtration 3 assembly includes a device capable of informing an individual of the effectiveness of the filtration membrane 37 and/or filtration material 36.

In an embodiment, a PCB associated with a UV light monitors the number of usages of a filtration material in a filtration assembly. In an embodiment, a filtration material can be used for up to 1 gallon, 2 gallons, 3 gallons, 4 gallons, 5 gallons, 6 gallons, 7 gallons, 8 gallons, 9 gallons, 10 gallons, 11 gallons, 12 gallons, 13 gallons, 14 gallons, 15 gallons, 16 gallons, 17 gallons, 18 gallons, 19 gallons, 20 gallons, 21 gallons, 22 gallons, 23 gallons, 24 gallons, 25 gallons, 26 gallons, 27 gallons, 28 gallons, 29 gallons, 30 gallons, 31 gallons, 32 gallons, 33 gallons, 34 gallons, 35 gallons, 36 gallons, 37 gallons, 38 gallons, 39 gallons, 40 gallons, 41 gallons, 42 gallons, 43 gallons, 44 gallons, 45 gallons, 46 gallons, 47 gallons, 48 gallons, 49 gallons, 50 gallons or more.

In an embodiment, a disposable filtration material 36 can be reused at least 1 time, 2 times, 3 times, 4 times, 5 times, 6 times, 7 times, 8 times, 9 times, 10 times, 11 times, 12 times, 13 times, 14 times, 15 times, 16 times, 17 times, 18 times, 19 times, 20 times, 21 times, 22 times, 23 times, 24 times, 25 times, 26 times, 27 times, 28 times, 29 times, 30 times, 31 times, 32 times, 33 times, 34 times, 35 times, 36 times, 37 times, 38 times, 39 times, 40 times, 41 times, 42 times, 43 times, 44 times, 45 times, 46 times, 47 times, 48 times, 49 times, 50 times, 51 times, 52 times, 53 times, 54 times, 55 times, 56 times, 57 times, 58 times, 59 times, 60 times, 61 times, 62 times, 63 times, 64 times, 65 times, 70 times, 75 times, 80 times, 85 times, 90 times, 95 times, 100 times, 110 times, 120 times, 130 times, 140 times, 150 times, 160 times, 170 times, 180 times, 190 times, 200 times, 210 times, 220 times, 230 times, 240 times, 250 times, 260 times, 270 times, 280 times, 290 times, 300 times, 325 times, 350 times, 375 times, 400 times, 425 times, 450 times, 475 times, 500 times, or more times before the disposable filtration material 36 has to be replaced.

In an embodiment, a replacement filtration assembly is sold in a package with one, two, three, four, five, six, seven, eight, nine, ten, eleven, twelve, thirteen, fourteen, fifteen, sixteen, seventeen, eighteen, nineteen, twenty or more individual filtration assembly units. In an embodiment, a replacement filtration material is sold in a package with one, two, three, four, five, six, seven, eight, nine, ten, eleven, twelve, thirteen, fourteen, fifteen, sixteen, seventeen, eighteen, nineteen, twenty or more individual units of a filtration material.

In an embodiment a filtration assembly 3 removes at least 1%, at least 2%, 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100% of the contaminants in a fluid that has flowed through the filter assembly 3. In an embodiment, a contaminant is a pathogen or other harmful substance.

Figure 11A:
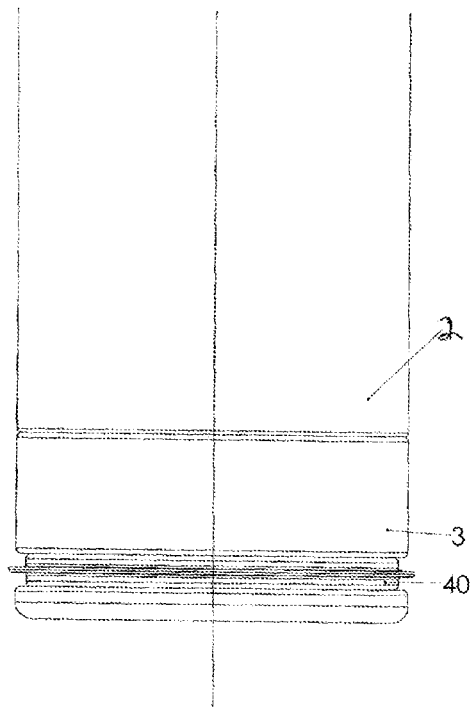
FIG. 11A depicts an external view of an inner bottle containing a filtration assembly.
Figure 11B:
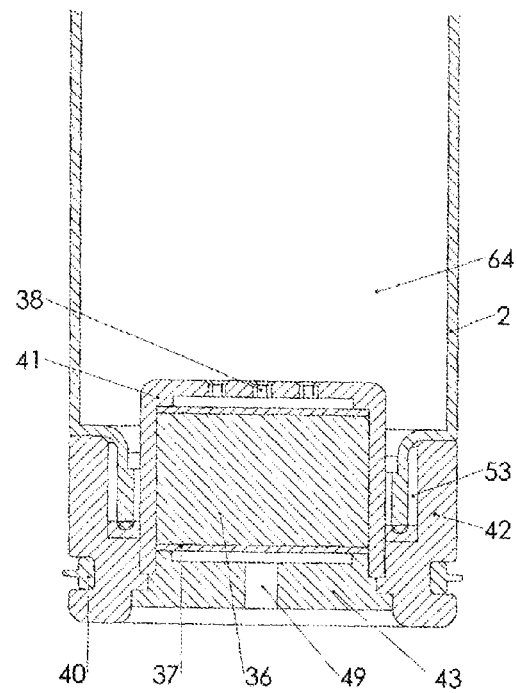
FIG. 11B depicts a cross-section of an inner bottle and a filtration assembly.

FIGS. 11a and 11b depict a cross section of an inner bottle 2 with a filter assembly attached. FIG. 11a depicts an external view of an inner bottle 2 with a filter assembly attached showing a bottle dynamic seal 40 and a filter assembly 3. FIG. 11b shows the same inner bottle 2 in cross section.

Figure 12:
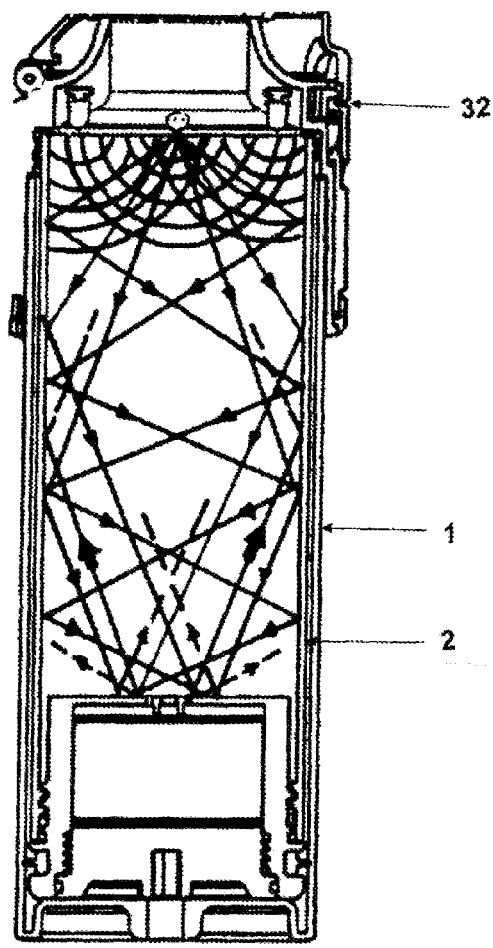
FIG. 12 depicts UV radiation from a UV purification module in a cross-section of a fluid container.

FIG. 12 depicts a fluid container, comprising an inner bottle 2 and outer bottle 1 wherein a UV light source has been activated and the resulting UV light radiation seen by lines with arrows emanating from a UV light source 32 in the lid. The UV light radiation is shown going throughout a fluid in an inner bottle 2 and bouncing off the walls, the lid and the filtration assembly 3. In an embodiment, a similar degree of coverage occurs from a UV light source located in the filtration assembly 3, in a fluid, or in, or on an inner wall of an inner bottle 3.

In another embodiment, an exit port is positioned on or within the removable cap. An exit port may, without limitation, include a flow monitor to measure flow output from the interior of a fluid container. out the tip of the removable cap by means of a flow sensor that measures the amount of liquid passing through the exit port through which a fluid is removed from the fluid container. In an embodiment, the output device is a flow sensor designed as an integral portion of the removable cap and is used for measuring the output of fluid from the fluid container. In an embodiment, a flow sensor is of a design such that it is capable of measuring the quantity of a fluid that exits a fluid container. In a further embodiment, a flow sensor is located in a pathway through which a fluid passes from the interior of a fluid container through the exit port. In another embodiment, a flow sensor is able to accurately measure the amount of fluid that exits the exit port.

In an embodiment, purification includes, without limitation, filtration, sterilization, the use of a germicide, an antibiotic and/or a gas to remove a pathogen and/or harmful agent.

A fluid container comprises, without limitation, a device, comprising a recorder/reporter and/or transmission unit capable of collecting and recording data pertaining to the rate of fluid flow in real time from flow meter. A device is connected to an output device via a connector and is optionally capable of transmitting data to an analysis unit or directly reporting to the user with an output gage or viewing area on the fluid container. In an embodiment, a recorder/reporter and transmission and flow meter are, without limitation, both on a cap, connected through an electronic wiring connection. In another embodiment, a recorder/reporter and transmission unit is located, without limitation, on a fluid container and a flow meter is on the tip of the cap, and the electronic connection between the two takes place when the circuit is completed upon complete closure of the cap unto the water bottle. In the absence of complete closure, the circuit remains open and the connection lost with no communication between recorder and flow sensor units.

According to another embodiment, a transmission component of the recorder/reporter and transmission unit is capable of transmitting the data from the recorder/reporter unit to an analysis unit. In an embodiment, a transmission from a recorder/reporter unit to an analysis unit is via a wired connection whereby data is transferred to analysis unit via a transferable media such as USB flash drive, firewire connection or similar. In another embodiment, a transmission from a recorder/reporter unit to an analysis unit is via wireless connection whereby data is transferred to analysis unit via a wireless means such as WiFi, WiMax, Bluetooth, RFID or similar. Alternately, the transmission may be done by a combination of both a wired and wireless connection.

In an embodiment, a wired analysis unit design can comprise software on any computer terminal, which upon direct connection to the transferable media (USB flashdrive, etc) allows users to download data to the computer for analysis. In a further embodiment, a wired analysis unit can comprise a device that is connected to a fluid container and capable of displaying information, including, without limitation, from a flow meter on fluid and/or an additive removed from a fluid container. In an embodiment, a wireless analysis unit design comprises a downloadable application for any smartphone, mobile portable computer/laptop and/or tablet. In an embodiment, an application is capable of secure or insecure wireless connection and collection of data in real time, from a transmission unit of a recorder/reporter unit.

In another embodiment, an application comprises a customizable user interface, capable of tracking and graphing real time data for single or multiple users and providing user(s) with a snapshot of their fluid intake as a function of different variables, including but not limited to, exercise time, exercise intensity, environmental factors (e.g., temperature, altitude). In an embodiment, an application comprises a user-defined functionality capable of communicating (such as via computer voice, etc.) the real time data functionality to the user or a third party during or after exercise. In another embodiment, an application individualizes data collection to allow users to track and customize their fluid/electrolyte intake during an exercise.

In another embodiment, a method of measuring fluid output from a fluid container and user intake is provided that, first, comprises, without limitation, a fluid container. In an embodiment, a fluid container is, without limitation, a water bottle or other fluid container that is filled with a fluid, such as, without limitation, water. If purified water is preferred, a filter assembly is used, without limitation, to fill a fluid container with filtered water. In an embodiment, an output device measures the amount of fluid dispensed out of a fluid container and records it in a reporter unit. A reporter unit next outputs the data to an individual, thus allowing the individual to analyze the data in a defined format (including, without limitation, real time, etc). In an embodiment a fluid container also has a package containing an additive. A package containing an additive is placed within a fluid container, containing a fluid, and an exit port or cap closed. In an embodiment, a package with an additive is released into a fluid, and after brief mixing, a fluid is ready for consumption by an individual. An individual dispenses a fluid and additives and the fluid contents within a fluid container are moved through the output device and out an exit port. A device measures an amount of fluid and additives being dispensed out of a fluid container and records it in a reporter unit. A reporter unit then outputs the data to an individual, thus allowing the user to analyze the data in preferred individual defined format (for example, without limitation, real time, etc). An individual can then account for fluid intake and intake of other additives to the fluid.

According to another embodiment, a method comprises measuring and reporting additive consumption. According to this embodiment, first, a package containing an additive (including, without limitation, a disposable and/or squeezable package) containing one or more additives is inserted into a cap of a fluid container. Next, the cap of the fluid container is closed. A package containing an additive includes, without limitation, a permeable barrier which is punctured when the cap of the fluid container is closed, by, for example, and without limitation, a puncturing protrusion in the cap opening. The contents of a package containing an additive are dispensed into a fluid held within the interior of a fluid container in a fluid holder portion of the fluid container. In an embodiment, the contents of a package containing an additive are a quantitative known amount, which are dispensed quantitatively from the package containing an additive and into the fluid container. In an embodiment, the package containing an additive is collapsed after dispensing its contents into the fluid holder portion of the fluid container. The package containing an additive may then be optionally disposed of. After closing of the cap and dispensing of the contents of the package containing an additive into the fluid, the package containing an additive has its contents may be mixed with the fluid. Next, the user dispenses fluid from the interior of the fluid container, out the removable cap, and out the exit port. During outtake of fluid from the fluid container, the flow sensor unit measures the amount of fluid dispensed through the fluid container. As the amount of additive is also known from the quantitative amount dispensed by the package containing an additive into the fluid within the fluid container, the amount of additive is also calculable by the flow of fluid from the fluid container and measured by the output device. The amount of fluid and/or additive is then recorded by the recorder/reporter unit. Data may be stored in the recorder unit until user downloads it to a flash drive or other storage media, and/or data is transmitted via a wireless connection to an application on a smartphone, tablet, computer or similar device.

According to another embodiment, a method of measuring and reporting additive consumption, employed the methods described above is employed. However, the package containing an additive is fitted to the fluid container rather than the cap.

In an embodiment, a flow meter includes, without limitation, a sensor fitting at the tip of a manual connector. Known examples of a manual connector which may be used according to the invention include a CAMELBAK® QUICK LINK™, having tubing or similar to measure fluid flow from the fluid container is employed.

In another embodiment, a recorder/reporter and transmission unit design comprises a recorder/reporter and transmission unit capable of collecting and recording data pertaining to the rate of fluid flow in real time from flow sensor, a connection to the flow sensor unit, a method for transmission of the data to an analysis unit. In an embodiment, a recorder/reporter and transmission and flow sensor (output device) are both on the cap. In another embodiment, a flow sensor unit is fitted on the tip of a manual connector, such as a CAMELBAK® QUICK LINK™, and the recorder/reporter and transmission unit is fitted around CAMELBAK® tubing (below the tip). In an embodiment, a flow sensor unit and a recorder/reporter and transmission unit are connected through an electronic wiring connection, which, without limitation, can be linked manually.

In another embodiment, a transmission component of a recorder/reporter is capable of transmitting the data from the recorder/reporter unit to an analysis unit. In an embodiment, a transmission unit and analysis unit designs comprise the same design or alternatively a different design along with methods of use as described previously.

In an embodiment, a fluid container allows for the purification and/or sterilization of a fluid from any source. In an embodiment, a fluid is water obtained from public source, such as a river, a stream, a puddle, a pond, a lake or any other water source. In an embodiment, a fluid container is used by an individual in a country where the water is known to include pathogens and harmful agents and the filtration assembly and UV light source are used to purify and/or sterilize the water so that it is consumable by an individual.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present invention, which is defined solely by the claims. Accordingly, the present invention is not limited to that precisely as shown and described.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The invention claimed is:

1. A modular fluid container having an inner bottle selectively slidably received within an outer bottle, the fluid container comprising:
   a filtration module comprising a filter assembly configured for operable engagement within the inner bottle comprising a first and a second end, the first end opposite the second end, the filter assembly comprising a filter inlet hole disposed on the first end and inside the outer bottle, a filtration material and filtration membrane disposed between the first end and the second end in fluid communication with the filter inlet hole, and an inner bottle one-way valve disposed on the second end offset from the filter inlet hole and substantially separated from the filter inlet hole by the filtration material and the filtration membrane, the inner bottle one-way valve configured for allowing fluid flow from the filter inlet hole through the filtration material and into the inner bottle but not out of the inner bottle back into the filtration material, the filtration module configured for removal of pathogens and harmful substances from a fluid;
   a UV purification module comprising a UV light housing having at least one UV light source operably installed within the UV light housing configured for emitting UV light in a germicidal spectrum for disinfection of a volume of a fluid held in the inner bottle;
   an additive storage and dispensing module configured for operable installation on the outer bottle and to contain and selectively dispense an additive that can be added to a volume of filtered fluid held in the inner bottle; and
   a flow meter module formed within one of a pour mouthpiece, a pull-up straw mouthpiece, and a straw configured for operable installation within a lid sealably engageable with the inner bottle for selectively closing the upper inner bottle opening, the flow meter module configured for quantitatively monitoring fluid flow from the inner bottle substantially in real time.

2. A fluid container comprising: an outer bottle having an outer bottle base and a substantially opposite outer bottle opening, the outer bottle further having an outer bottle one-way valve formed within the outer bottle base and configured for allowing fluid flow into the outer bottle but not out of the outer bottle; an inner bottle configured for slidable receipt within the outer bottle through the outer bottle opening, the inner bottle having an inner bottle base and a substantially opposite upper inner bottle opening, the inner bottle further having a filter assembly formed at the inner bottle base with a first end and a second end, the first end opposite the second end, wherein the filter assembly comprises a filter inlet hole disposed on the first end and inside the outer bottle, a filtration material and filtration membrane disposed between the first end and the second end in fluid communication with the filter inlet hole, and an inner bottle one-way valve disposed on the second end offset from the filter inlet hole and substantially separated from the filter inlet hole by the filtration material and the filtration membrane, the inner bottle one-way valve configured for allowing fluid flow from the filter inlet hole through the filtration material and into the inner bottle but not out of the inner bottle back into the filtration material; a sliding dynamic seal formed between the outer and inner bottles, whereby slidably shifting the inner bottle higher within the outer bottle draws fluid into the outer bottle through the outer bottle one-way valve, and further whereby slidably shifting the inner bottle lower within the outer bottle causes fluid in the outer bottle to pass through the filter assembly and into the inner bottle; and a UV purification module operably installed within the inner bottle, the UV purification module comprising a UV light housing having at least one UV light source operably installed within the UV light housing configured for emitting UV light in a germicidal spectrum for disinfection of a volume of a fluid held in the inner bottle.

3. The fluid container of claim 2, wherein slidably shifting the inner bottle lower within the outer bottle causes fluid in the outer bottle to pass through the filter inlet hole, the filtration material, and the inner bottle one-way valve and into the inner bottle, and further whereby slidably shifting the inner bottle higher within the outer bottle closes the inner bottle one-way valve so as to draw fluid into the outer bottle through the outer bottle one-way valve.

4. The fluid container of claim 3, wherein:
the inner bottle base defines a lower inner bottle opening substantially opposite of the upper inner bottle opening; and
the filter assembly is positioned in the lower inner bottle opening.

5. The fluid container of claim 4, wherein the filter assembly further comprises:
a lower filter enclosure cap having the filter inlet hole; and
a filter upper media enclosure installed on the lower filter enclosure cap, the filtration material being housed substantially between the filter upper media enclosure and the lower filter enclosure cap.

6. The fluid container of claim 5, wherein:
the lower filter enclosure cap extends beyond an annular outer wall of the inner bottle; and
the sliding dynamic seal extends substantially outwardly from the lower filter enclosure cap substantially radially beyond the outer wall of the inner bottle.

7. The fluid container of claim 5, wherein:
the lower filter enclosure cap is installed on a filter lower enclosure; and
the filter upper media enclosure is installed on the filter lower enclosure substantially opposite of the lower filter enclosure cap.

8. The fluid container of claim 7, wherein:
the filter lower enclosure extends beyond an annular outer wall of the inner bottle; and
the sliding dynamic seal extends substantially outwardly from the filter lower enclosure substantially radially beyond the outer wall of the inner bottle.

9. The fluid container of claim 5, wherein the inner bottle one-way valve is formed within the filter upper media enclosure.

10. The fluid container of claim 5, wherein:
the filter upper media enclosure defines a filter honeycomb; and
the inner bottle one-way valve is positioned within the filter honeycomb.

11. The fluid container of claim 5, wherein:
the UV light housing is mounted adjacent to the filter upper media enclosure of the filter assembly; and
the at least one UV light source is directed generally toward the upper inner bottle opening.

12. The fluid container of claim 3, wherein the filter assembly comprises two or more filtration materials.

13. The fluid container of claim 3, wherein the filtration material is selected from the group consisting of carbon, sepharose, sephadex, sand, glass, fiberglass, cotton, polyester, ceramic, ceramic sand, porous ceramic balls, porous ceramic, KDF, KDF55, activated carbon, porcelain and FMS.

14. The fluid container of claim 3, wherein an additive dispensing system is formed on the outer bottle base.

15. The fluid container of claim 14, wherein the additive dispensing system comprises a rotating ring operably installed within the additive dispensing system, the rotating ring being formed with a ring hole for dispensing an additive.

16. The fluid container of claim 15, wherein the additive is selected from the group consisting of a tablet, a tablet contained within a capsule, a tablet contained within a package made of paper, a tablet contained within a package made of aluminum foil, a tablet contained within a package made of plastic, a tablet contained within a package made of a composite, a tablet contained within a package configured as a blister pack, a powder, a powder contained within a capsule, a powder contained within a package made of paper, a powder contained within a package made of aluminum foil, a powder contained within a package made of plastic, a powder contained within a package made of a composite, a powder contained within a package configured as a sealed cup, a powder contained within a package configured as a pouch, a liquid, a liquid contained within a capsule, a liquid contained within a package made of paper, a liquid contained within a package made of aluminum foil, a liquid contained within a package made of plastic, a liquid contained within a package made of a composite, a solid, a solid contained within a capsule, a solid contained within a package made of paper, a solid contained within a package made of aluminum foil, a solid contained within a package made of plastic, a solid contained within a package made of a composite, a solid contained within a package configured as a blister pack, a solid contained within a package configured as a sealed cup, and a solid contained within a package configured as a pouch.

17. The fluid container of claim 2, further comprising a lid sealably engageable with the inner bottle for selectively closing the upper inner bottle opening, the lid operably incorporating a flow meter.

18. The fluid container of claim 17, wherein the flow meter comprises:
a flow meter housing having installed therein a magnetic sensor; and a flow meter impeller operably installed within the flow meter housing, the flow meter impeller having an impeller magnet configured for detection by the magnetic sensor as the flow meter impeller spins with the flow thereby of a fluid.

19. The fluid container of claim 17, wherein the flow meter is incorporated within one of a pour mouthpiece, a pull-up straw mouthpiece, and a straw formed within the lid.

20. A fluid container comprising: an outer bottle having an outer bottle base and a substantially opposite outer bottle opening and an outer bottle one-way valve formed within the outer bottle base and configured for allowing fluid flow into the outer bottle but not out of the outer bottle; an inner bottle configured for slidable receipt within the outer bottle through the outer bottle opening, the inner bottle having an inner bottle base defining a lower inner bottle opening and having a substantially opposite upper inner bottle opening; a filter assembly positioned in the lower inner bottle opening comprising a first end and a second end, the first end opposite the second end, the filter assembly comprising a filter upper media enclosure installed on a lower filter enclosure cap having a filter inlet hole disposed on the first end and inside the outer bottle, the filter assembly housing a filtration material and filtration membrane disposed between the first end and the second end in fluid communication with the filter inlet hole, and an inner bottle one-way valve disposed on the second end offset from the filter inlet hole and substantially separated from the filter inlet hole by the filtration material and the filtration membrane, and further having the inner bottle one-way valve formed within the filter upper media enclosure, the inner bottle one-way valve configured for allowing fluid flow through the filtration material and into the inner bottle but not out of the inner bottle back into the filtration material; a sliding dynamic seal formed between the outer and inner bottles as being installed so as to extend substantially radially outwardly from the filter assembly, whereby slidably shifting the inner bottle higher within the outer bottle draws fluid into the outer bottle through the outer bottle one-way valve and whereby slidably shifting the inner bottle lower within the outer bottle causes any fluid in the outer bottle to pass through the filter assembly, and particularly the filter inlet hole, the filtration material, and the inner bottle one-way valve, and into the inner bottle; and a UV purification module operably installed within the inner bottle, the UV purification module comprising a UV light housing having at least one UV light source operably installed within the UV light housing configured for emitting UV light in a germicidal spectrum for disinfection of a volume of a fluid held in the inner bottle.

* * * * *